(12) United States Patent
Wittenbreder, Jr.

(10) Patent No.: US 7,480,156 B1
(45) Date of Patent: Jan. 20, 2009

(54) TAPPED INDUCTOR POWER CONVERSION NETWORKS

(76) Inventor: Ernest Henry Wittenbreder, Jr., 3260 S. Gillenwater Dr., Flagstaff, AZ (US) 86001-8946

( * ) Notice: Subject to any disclaimer, the term of this patent is extended or adjusted under 35 U.S.C. 154(b) by 151 days.

(21) Appl. No.: 11/620,341

(22) Filed: Jan. 5, 2007

Related U.S. Application Data

(60) Provisional application No. 60/757,561, filed on Jan. 7, 2006.

(51) Int. Cl.
*H02H 3/335* (2006.01)
(52) U.S. Cl. .................................................. 363/20
(58) Field of Classification Search .................. 363/16, 363/20, 21.01, 131
See application file for complete search history.

(56) References Cited

U.S. PATENT DOCUMENTS 4,056,693 A * 11/1977 Bosik et al. ................ 379/418
4,736,284 A * 4/1988 Yamagishi et al. ............ 363/16
7,193,396 B2 * 3/2007 Orr .............................. 323/225

* cited by examiner

*Primary Examiner*—Adolf Berhane

(57) ABSTRACT

The subject invention reveals new three terminal tapped inductor canonical cells for non-isolated power conversion. The canonical cells achieve reduced semiconductor component stresses for applications with limited line voltage range for small step up and step down ratios or for large step up and step down ratios. Some of the canonical cells can be used to form buck, boost, and buck boost converters. Another of the canonical cells is a member of the SEPIC family which can both step up and step down or operate in all four quadrants. Related canonical cells which achieve zero voltage switching and improved electromagnetic compatibility are also revealed. A new more robust floating gate drive control circuit is revealed which operates without magnetic components, without optical coupling, and without high voltage semiconductors is revealed.

18 Claims, 39 Drawing Sheets

TAPPED INDUCTOR POWER CONVERSION NETWORKS

CROSS REFERENCE TO RELATED APPLICATIONS

This application claims the benefit of PPA Ser. No. 60/757,561, filed Jan. 7, 2006 by the present inventor.

BACKGROUND OF THE INVENTION

1. Field of the Invention

The subject invention generally pertains to electronic power conversion circuits, and, more specifically, to high frequency, switched mode electronic power converters. The subject matter relates to new non-isolated power conversion networks which provide high efficiency power conversion under special conditions where more conventional power conversion networks do not work well.

2. Description of Related Art

The solution to the problem of converting power where the input to output or output to input voltage ratio is either very small or very large has traditionally relied upon tapped inductor power converters. An example of a circuit that achieves improved efficiency over the known alternatives for large input to output step down ratios is illustrated in FIG. 1. FIG. 1 is a tapped inductor buck converter. Compared to a simple buck converter the component stress factors for the FIG. 1 circuit are superior to the simple buck converter. $M_1$ in FIG. 1 operates at higher duty cycle and lower current than the high side switch of the simple buck converter and $M_2$ operates at lower duty cycle and higher current than the low side switch of the simple buck converter. The voltage stress of $M_1$ is increased over the voltage stress of the high side switch in the simple buck converter and the voltage stress of $M_2$ is reduced by comparison to the low side synchronous rectifier of the simple buck converter. In the FIG. 1 circuit the component stresses of $M_1$ and $M_2$ are evenly shared, whereas in the simple buck converter the conduction losses are almost all in the low side switch since the duty cycle for the simple buck converter is very small. Also the FIG. 1 circuit has advantages over the simple buck converter in that the switching losses for the $M_1$ switch are reduced in the FIG. 1 circuit, because the current in the $M_1$ switch is reduced. The switch $M_1$ in FIG. 1 experiences an increased voltage stress compared to the high side main switch in a simple buck converter, which offsets some of the advantages of the tapped inductor configuration, yet there is still a net benefit to the tapped inductor approach. The voltage applied to $M_1$ during its off state is equal to the input voltage plus the $L_1$ winding voltage. There is a buck derived converter that is useful for high step down ratios wherein the switch voltage stress never exceeds the input voltage, which is illustrated in FIG. 2. The FIG. 2 circuit is not a tapped inductor circuit and does not provide power to the load during the on time of the main switch $M_1$, but it does provide isolation. What is needed is a tapped inductor buck converter without a voltage stress penalty for the main switch.

A circuit that has grown in popularity in recent years, especially for battery powered circuits is the single ended primary inductor converter (SEPIC), and, particularly, the four switch, dual modulator SEPIC. FIG. 19 illustrates how the four switch dual modulator SEPIC is synthesized from buck and boost converters connected in cascade. The four transistor dual modulator SEPIC uses a single inductor and can convert an input voltage to an output voltage that is either higher than or lower than the input voltage. In many cases the output voltage is near to the input voltage so that the step up or step down ratio is very small. If the output voltage is always less than the input voltage, then a tapped inductor buck converter would be the best solution. If the output voltage was always greater than the input voltage a tapped inductor boost converter would be the best solution. What is needed is a tapped inductor SEPIC converter for the condition where the step up or step down ratio is small, but which can operate as either a step up or step down converter depending on whether the line voltage is less than or greater than the load voltage, respectively.

Both the SEPIC and the tapped inductor buck converter employ a high side switch. A reliable method for driving the high side switch employs a gate drive transformer. As time passes semiconductor solutions are becoming ever cheaper and are smaller than gate drive transformers. Level shifting transistor circuits work well at low voltages, but at high voltages the level shifting circuits are relatively slow and lossy. One semiconductor solution to high side drive is illustrated in FIG. 29. The FIG. 29 circuit achieves an improvement over its prior art by providing positive current feedback around the Schmitt buffer, which rejects changes in the output state of the Schmitt buffer due to small variations in the floating reference voltage (FRV). The positive current feedback achieves an enormous improvement in active clamp circuits where the source voltage of the high side switch varies during the on time of the high side switch. The FIG. 29 circuit is not immune from large fast changes in the floating reference voltage that can cause changes of state of the Schmitt buffer that are not commanded. For example, when the high side switch is commanded off, usually this would coincide with a command to turn on the low side switch, but, if there is a subsequent command to turn off or keep off the low side switch during the transition, then the floating reference voltage of the high side switch will swing low and then swing back high again. When the floating reference swings high, the input to the Schmitt trigger is pulled low, which results in turning the high side switch on again, which will likely not be the desired result. In order to turn off and keep off the high side switch, an OR gate and opto-coupler can be added to independently disable the high side switch, as illustrated in FIG. 30, but this circuit too has some drawbacks. Opto-couplers are relatively slow and the faster opto-couplers draw 10 milliamperes or more of current. They also have physical characteristics that change over time more than other types of semiconductors. They are often disallowed for military, space, and other high reliability applications, because of physical changes with aging. What is needed is a more reliable and faster semiconductor gate drive solution for switches with floating reference voltages, such as the high side switches in the new tapped inductor circuit topologies revealed in the subject application.

OBJECTS AND ADVANTAGES

An object of the subject invention is to reveal new beneficial circuit topologies for applications with limited line voltage range and either very large or very small step up or step down ratios.

Another object of the subject invention is to reveal new beneficial circuit topologies with lower component stress factors for applications with limited line voltage range where the converter must be capable of both small ratio step up and step down operation.

Another object of the subject invention is to reveal new improved methods of driving switches with floating reference voltages which can reject changes in state due to changes in the floating reference voltage.

Further objects and advantages of my invention will become apparent from a consideration of the drawings and ensuing description.

These and other objects of the invention are provided by novel circuit techniques that limit voltage stress of the power converter's switches and reduce component stress factors and which achieve more reliable high side drive where a floating reference voltage would otherwise create unintended changes in the conduction state of a high side switch.

BRIEF DESCRIPTION OF THE DRAWINGS

The present invention is illustrated by reference to the drawings.

FIG. 18(a) illustrates the voltage wave form of the $M_1$ switch of the FIG. 17 circuit according to the subject invention.

FIG. 18(b) illustrates the voltage wave form of the $M_2$ switch of the FIG. 17 circuit according to the subject invention.

FIG. 18(c) illustrates the voltage wave form of the $M_3$ switch of the FIG. 17 circuit according to the subject invention.

FIG. 18(d) illustrates the voltage wave form of the $M_4$ switch of the FIG. 17 circuit according to the subject invention.

FIG. 18(e) illustrates the current wave form of the $M_1$ switch of the FIG. 17 circuit according to the subject invention.

FIG. 18(g) illustrates the current wave form of the $M_3$ switch of the FIG. 17 circuit according to the subject invention.

FIG. 18(h) illustrates the current wave form of the $M_4$ switch of the FIG. 17 circuit according to the subject invention.

SUMMARY

The subject invention reveals new tapped inductor converter topologies that are useful for power converters with limited line voltage range and either small or large step up or step down load to line voltage ratios. The new circuit topologies achieve lower component voltage stress than prior art circuit topologies. Zero voltage switching variations of the new circuits are also revealed as well as new tapped inductor SEPIC family circuit structures. In addition, a robust semiconductor high side drive control circuit is revealed that achieves full control of a switch with a floating reference voltage without the use of magnetic components, opto-couplers or level shifting circuits.

DESCRIPTION OF THE PREFERRED EMBODIMENTS

Figure 1:
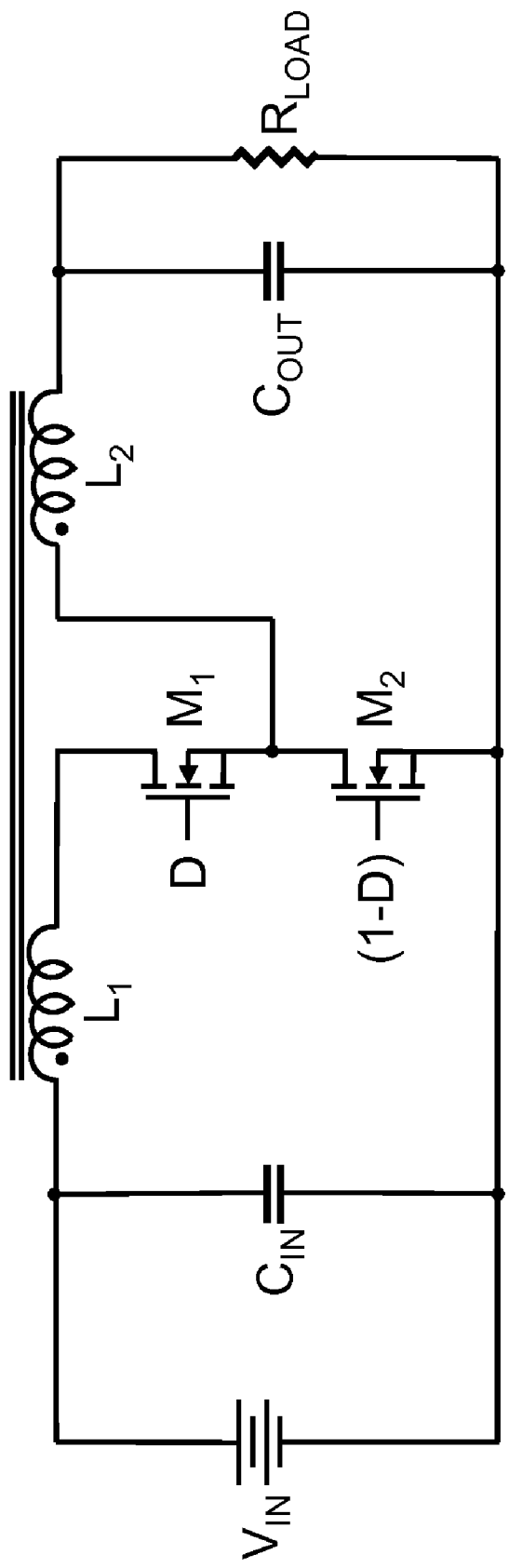
FIG. 1 illustrates a tapped inductor buck converter for large step down ratio according to the prior art.
Figure 2:
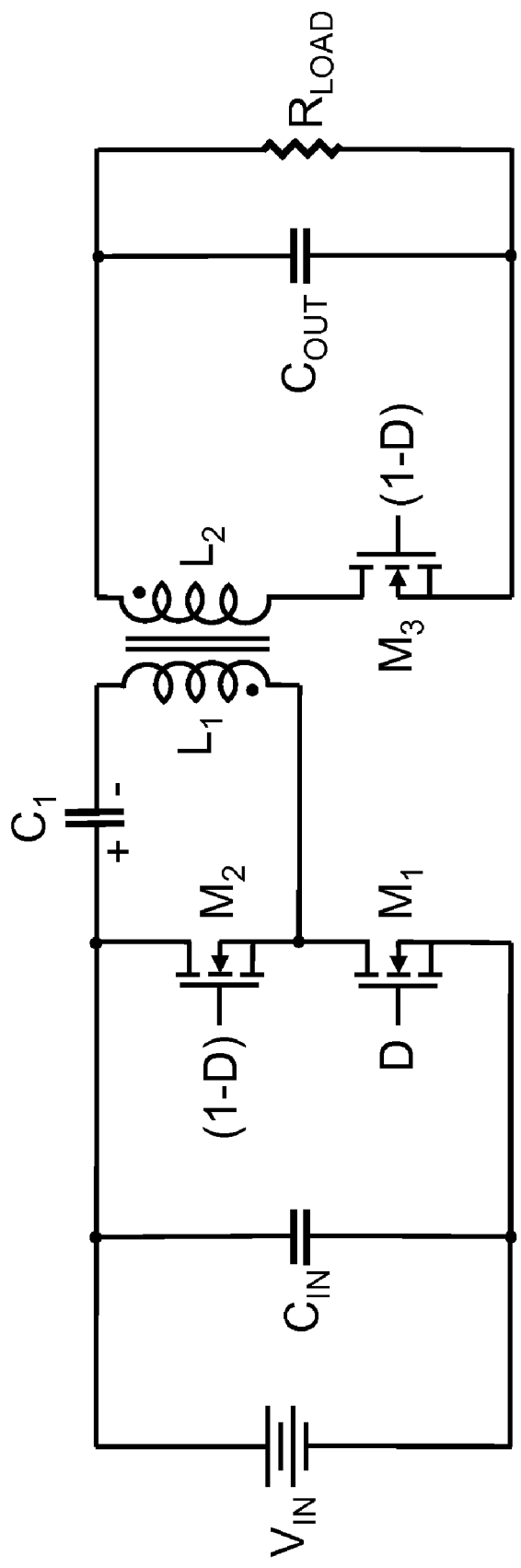
FIG. 2 illustrates an isolated coupled inductor buck converter according to the prior art.
Figure 3:
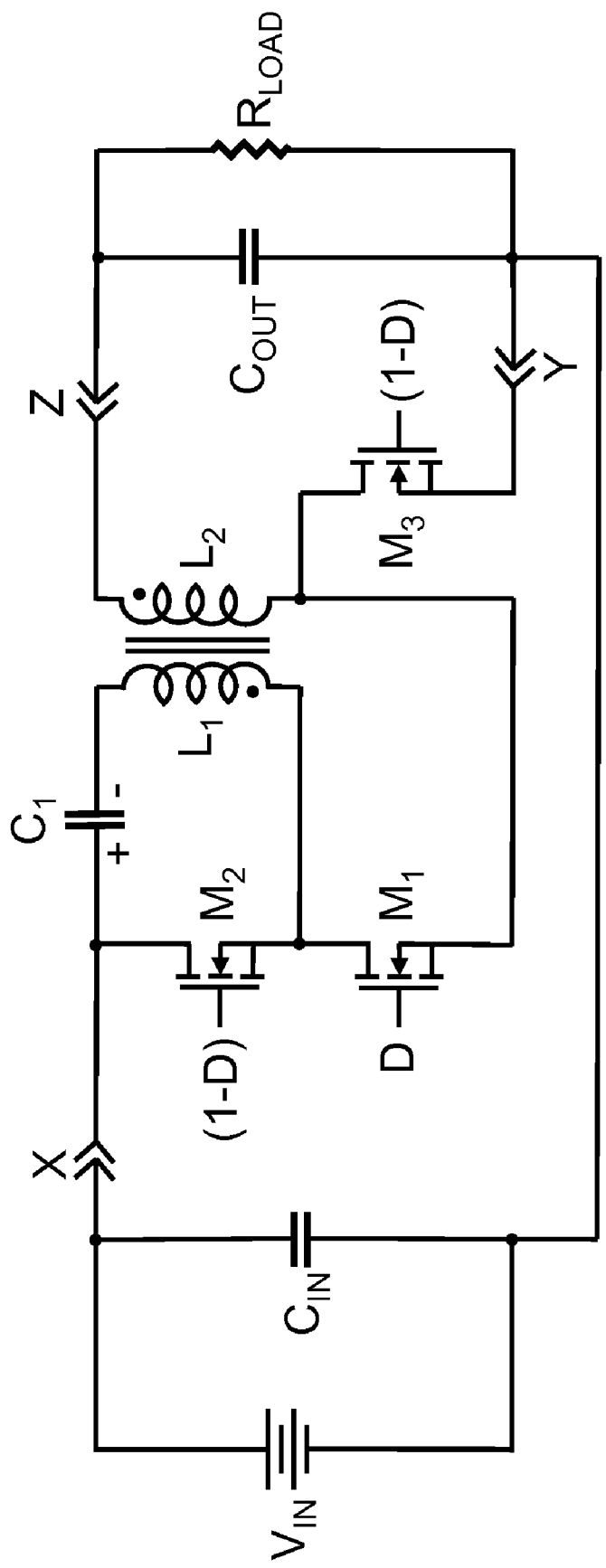
FIG. 3 illustrates a non-isolated tapped inductor buck converter with reduced voltage stress according to the subject invention.
Figure 4:
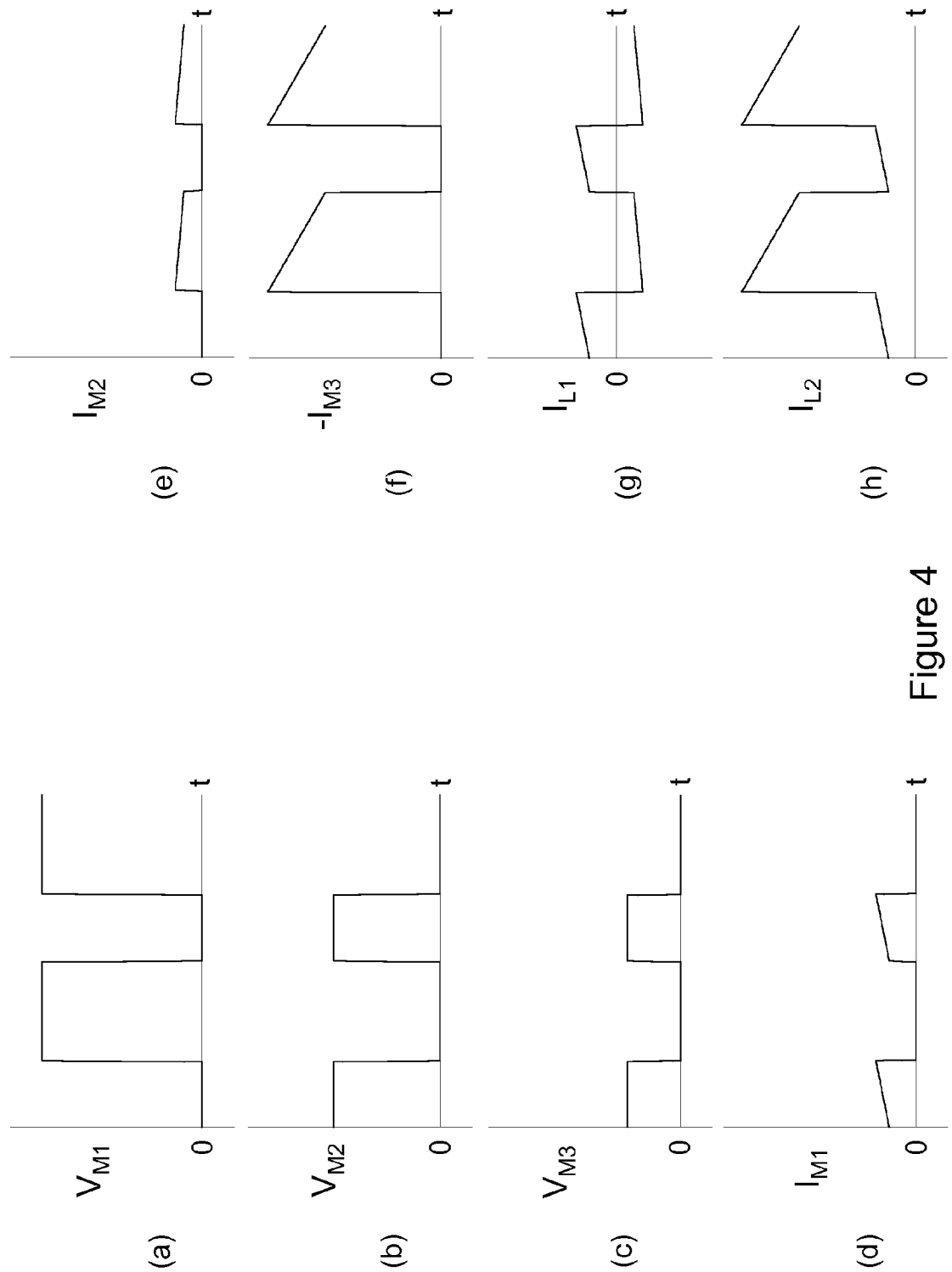
FIG. 4(a) illustrates the voltage wave form for the $M_1$ switch of FIG. 3 according to the subject invention.
FIG. 4(b) illustrates the voltage wave form for the $M_2$ switch of FIG. 3 according to the subject invention.
FIG. 4(c) illustrates the voltage wave form for the $M_3$ switch of FIG. 3 according to the subject invention.
FIG. 4(d) illustrates the current wave form for the $M_1$ switch of FIG. 3 according to the subject invention.
FIG. 4(e) illustrates the current wave form for the $M_2$ switch of FIG. 3 according to the subject invention.
FIG. 4(f) illustrates the current wave form for the $M_3$ switch of FIG. 3 according to the subject invention.
FIG. 4(g) illustrates the current wave form for the $L_1$ winding of FIG. 3 according to the subject invention.
FIG. 4(h) illustrates the current wave form for the $L_2$ winding of FIG. 3 according to the subject invention.

FIG. 3 illustrates a minimum voltage tapped inductor buck converter according to the subject invention. In FIG. 3 a first terminal of a source of dc voltage and power, $V_{IN}$, is connected to a first terminal of a capacitor, $C_{IN}$, and a first terminal, X, of a power conversion network. A second terminal of $V_{IN}$ is connected to a second terminal of capacitor, $C_{IN}$, a second terminal, Y, of the power conversion network, a first terminal of a capacitor, $C_{OUT}$, and a first terminal of a load, $R_{LOAD}$. The terminal, X, of the power conversion network is connected to a first terminal of a capacitor, $C_1$, and a first terminal of a switch, $M_2$. A second terminal of the capacitor, $C_1$, is connected to an undotted terminal of a winding, $L_1$, of a coupled inductor. A dotted terminal of the winding, $L_1$, is connected to a second terminal of the switch $M_2$ and to the first terminal of a switch, $M_1$. A second terminal of switch $M_1$ is connected to an undotted terminal of a winding $L_2$ of the coupled inductor and to a first terminal of a switch $M_3$. A second terminal of switch $M_3$ is connected to terminal Y of the power conversion network. A dotted terminal of winding $L_2$ is connected to a third terminal Z of the power conversion network. The terminal Z of the power conversion network is connected to a second terminal of the capacitor $C_{OUT}$, and to a second terminal of the load, $R_{LOAD}$.

For purposes of description and analysis we will assume that the circuit has reached a steady state condition. We will assume that the operation of the switches is break before make and we will assume that the values of capacitors are sufficiently large that the capacitor voltages are invariant over a full cycle of operation. In steady state operation, except for brief transition times between states, there are two operating states of the FIG. 3 circuit. In a first operating state the switch $M_1$ is on (conducting) and the switches $M_2$ and $M_3$ are off (not conducting). During the first operating state, current flows from $V_{IN}$ through the X terminal, through $C_1$, $L_1$, $M_1$, $L_2$ and through the Z terminal through $R_{LOAD}$ and back to $V_{IN}$. During the first operating state, stored energy builds in $C_1$ and the coupled inductor. During the first operating state, energy is transferred from the source $V_{IN}$ to $C_1$, the coupled inductor, and the load $R_{LOAD}$. At the end of the first operating state the stored energy is a maximum in $C_1$ and the coupled inductor. At the end of the first operating state $M_1$ is turned off. At the beginning of the second operating state $M_2$ and $M_3$ are turned on. During the second operating state current flows from the first terminal of $C_1$ through $M_2$ into the dotted terminal of $L_1$ and back to the second terminal of $C_1$, discharging $C_1$. Current in $L_1$ induces current in $L_2$ adding to the current flowing out of the dotted terminal of $L_2$ during the first operating state. The current flowing in $L_2$ flows through the Z terminal to $R_{LOAD}$ and through the Y terminal through $M_3$ back to $L_2$. During the second operating state stored magnetic energy in the coupled inductor ramps down. During the second operating state energy is transferred from $C_1$ to the coupled inductor and from the coupled inductor to the load $R_{LOAD}$. At the end of the second operating state the switches $M_2$ and $M_3$ are turned off and the cycle begins again when $M_1$ is turned on.

The voltages and currents for each of the switches and the currents for each of the windings are illustrated in FIGS. 4(a) through 4(h).

The FIG. 3 circuit comprises a non-isolated voltage step down converter. The output voltage is given by $$V_{OUT} = \frac{DV_{IN}}{(1+n)},$$

where $V_{OUT}$ is the load voltage, $V_{IN}$ is the input dc source voltage, n is the ratio of the number of turns of $L_1$ to the number of turns of $L_2$, and D is the fraction of a cycle that $M_1$ conducts. The FIG. 3 circuit is particularly beneficial for applications in which the output voltage is a small fraction of the input voltage. In applications where the output is a small fraction of the input voltage and the output and input share a common return path the FIG. 3 circuit has a lower component stress factor than a simple buck converter and will be significantly more efficient. Another beneficial feature of the FIG. 3 circuit is the limited voltage stress of the switches. The maximum voltage stress for $M_1$ is $V_{IN}$. The maximum stress for the other two switches is less than the voltage stress for $M_1$ and will depend on the turns ratio n and $V_{IN}$.

In the FIG. 3 circuit $M_3$ appears as a synchronous rectifier. If a rectifier diode is substituted for $M_3$ the operation of the circuit will be the same as described above and the FIG. 3 circuit with $M_3$ replaced by a diode should be considered an embodiment of the subject invention.

Figure 5:
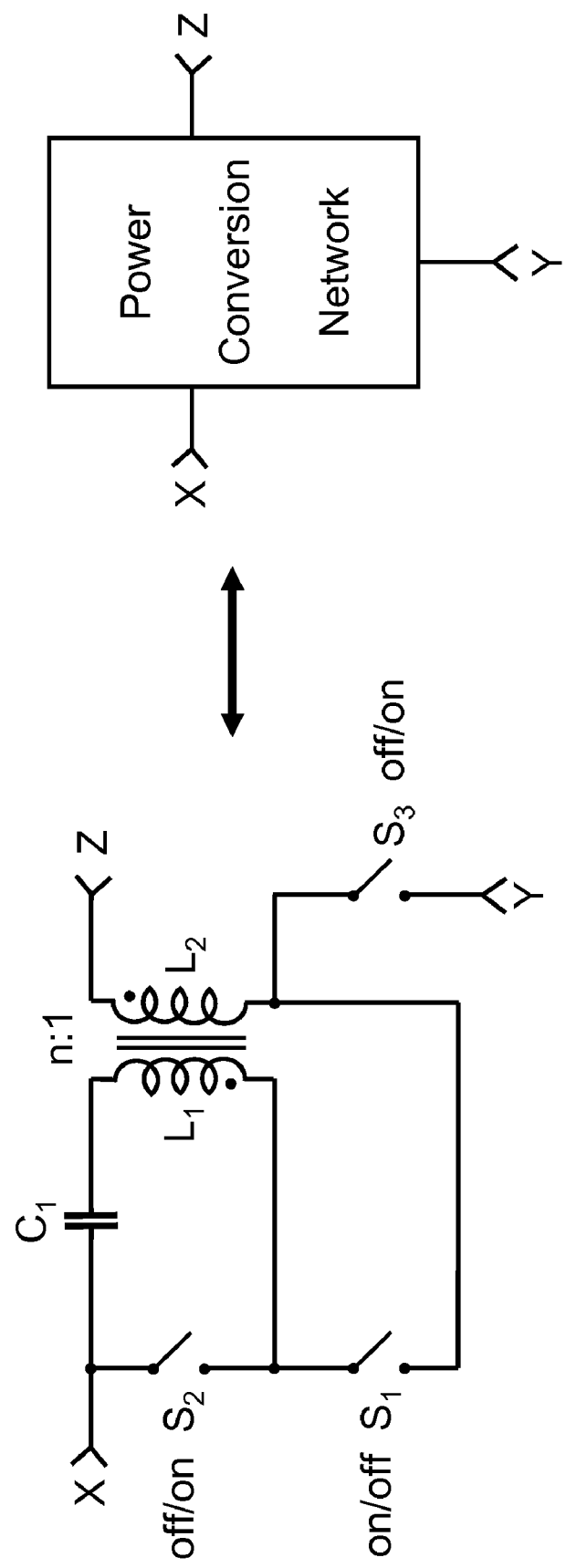
FIG. 5 illustrates a power conversion network, based on the FIG. 3 circuit, which can be configured to form a variety of power conversion circuits according to the subject invention.

Incorporated within the FIG. 3 circuit is a three terminal power conversion network, as illustrated in FIG. 5, wherein the three terminals are X, Y, and Z. This three terminal network of FIG. 5 can be viewed as a canonical cell with its own transfer function and should be considered as an embodiment of the subject invention. The transfer function for the power conversion network (canonical cell) of FIG. 5 is $$V_Z = V_Y + \frac{D(V_X - V_Y)}{(1+n)}. \tag{1}$$

For the FIG. 3 circuit $V_Y=0$ since Y is a common or ground connection in FIG. 3 for both the input and output, which we can arbitrarily set to zero without any loss of generality, $V_X=V_{IN}$, and $V_Z=V_{OUT}$. By making the substitutions indicated in equation (1) we obtain the transfer function for FIG. 3.

Figure 6:
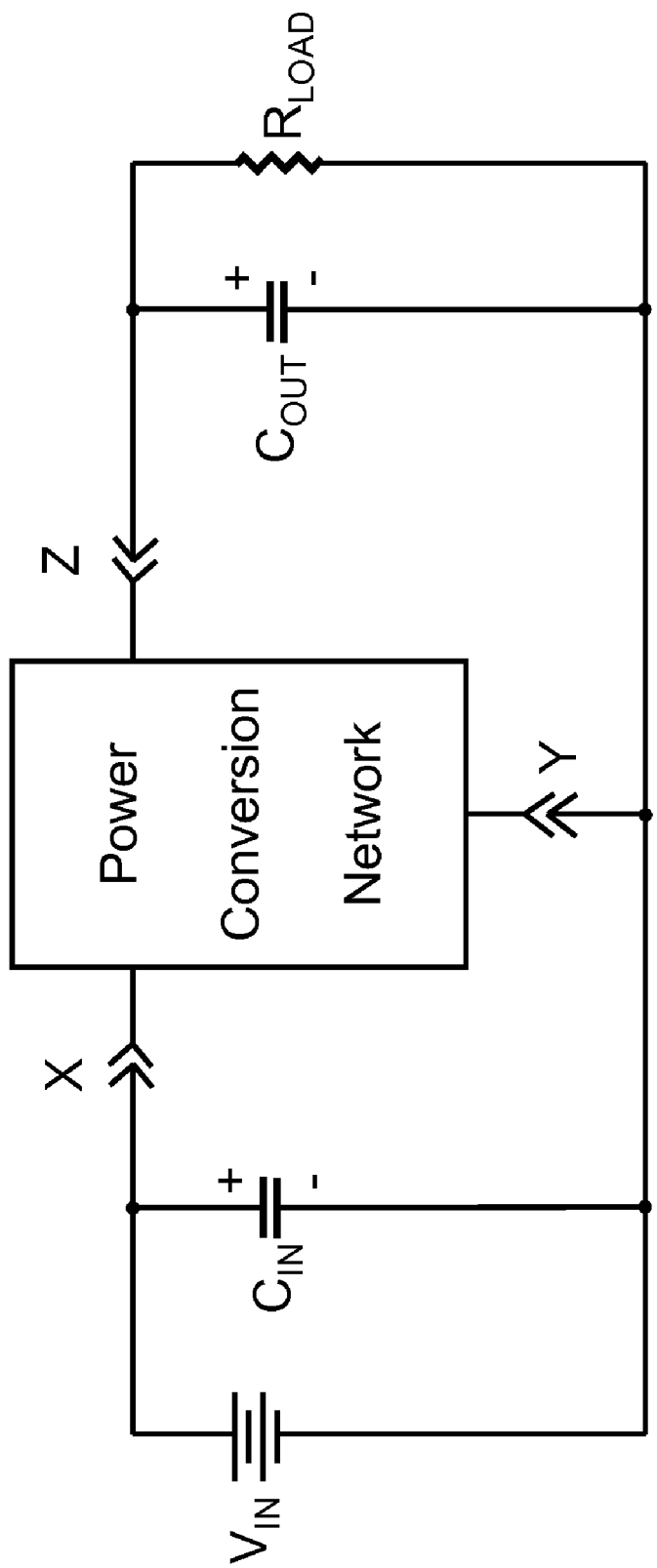
FIG. 6 illustrates the power conversion network of FIG. 5 used to form a tapped inductor buck converter for large step down ratio applications according to the subject invention.
Figure 7:
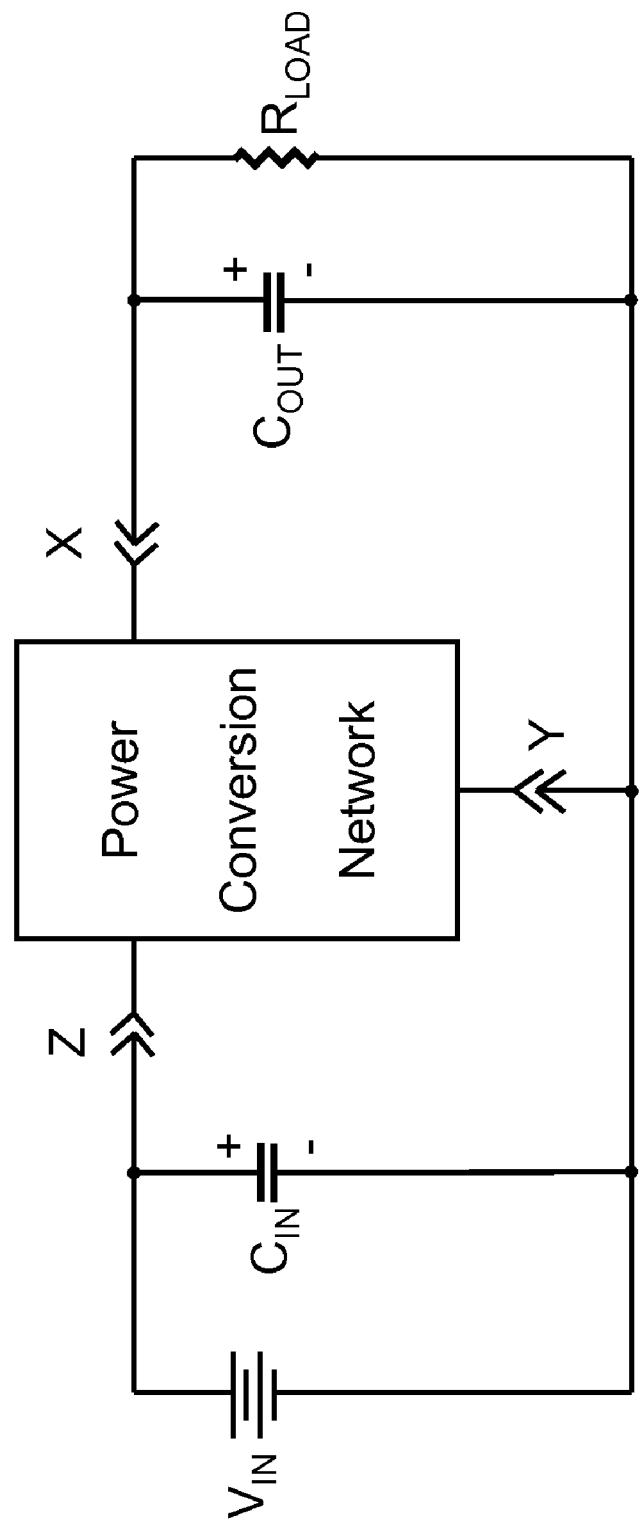
FIG. 7 illustrates the power conversion network of FIG. 5 configured to form a tapped inductor boost converter for large step up ratio applications according to the subject invention.

The power conversion network of FIG. 5 can be used to form a set of different power conversion circuits depending on how line, load, and common are connected to the X, Y, and Z terminals. FIG. 6, which is the same circuit as FIG. 3, illustrates how one can form a buck converter for large step down ratios from the power conversion network of FIG. 5. FIG. 7, which is another embodiment of the subject invention, illustrates how the power conversion network of FIG. 5 can be used to form a boost converter for large step up ratios. In FIG. 7 $V_Y=0$, $V_Z=V_{IN}$, and $V_X=V_{OUT}$. By substituting these values into equation (1) the transfer function for FIG. 7 is obtained. For FIG. 7 we obtain $$V_{IN} = 0 + \frac{D(V_{OUT} - 0)}{(1+n)}.$$

Usually the transfer function is solved for the output voltage and, in a boost converter the duty cycle refers to the fraction of a cycle that the lower switch, which is the switch connected to the common or ground, in this case $S_3$, is on, but in equation (1) D applies to the duty cycle of the $S_1$ switch. For the FIG. 7 circuit we need to replace D by (1−D'), where we now refer to the duty cycle of $S_3$, so that $$V_{OUT} = \frac{(1+n)V_{IN}}{(1-D')}$$

for FIG. 7, where D' is the fraction of a period that $S_3$ conducts. In the FIG. 7 circuit the power flow is reversed in the power conversion network by comparison to FIG. 6 and FIG. 3. The operating description provided for the FIG. 3 circuit applies to the FIG. 7 circuit, except that the line and load, or input and output, are reversed and the directions of all of the currents are reversed. Also, in the FIG. 7 circuit $S_3$ is the main switch and, with its current direction reversed it cannot be implemented with a diode rectifier, however, the $S_1$ switch, with its reversed current can be implemented with a diode rectifier.

Figure 8:
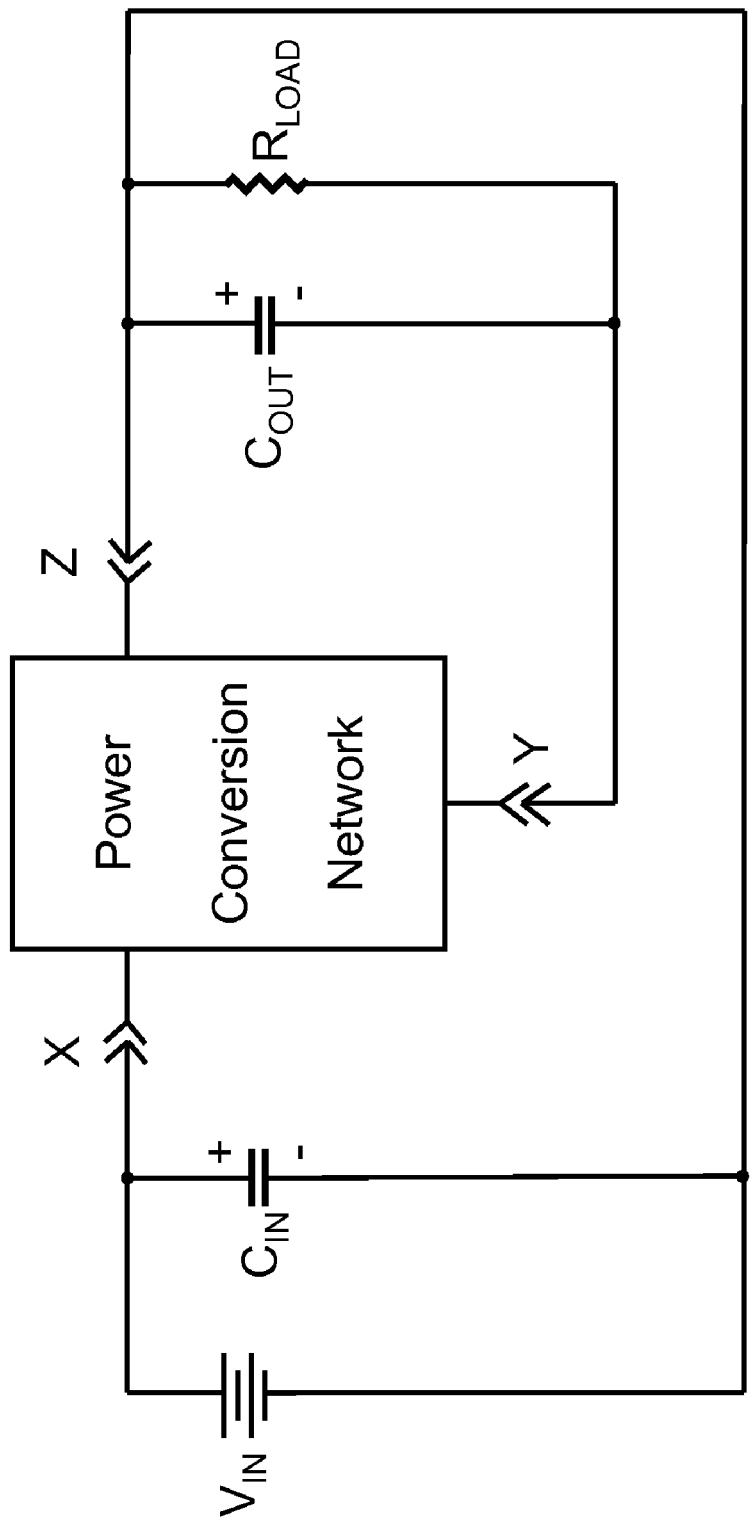
FIG. 8 illustrates the power conversion network of FIG. 5 configured to form a tapped inductor buck boost converter for large step down ratio inverting applications according to the subject invention.

FIG. 8, which is another embodiment of the subject invention, illustrates a buck boost or non-isolated flyback converter for large voltage step down ratios formed from the power conversion network of FIG. 5. For FIG. 8, Z is the common terminal so that $V_Z=0$, $V_X=V_{IN}$, and $V_Y=V_{OUT}$. We substitute these values into equation (1) to get the transfer function for FIG. 8 which yields $$0 = V_{OUT} + \frac{D(V_{IN} - V_{OUT})}{(1+n)}.$$

Solving for $V_{OUT}$ yields $$V_{OUT} = \frac{-DV_{IN}}{(1+n-D)}$$

for the transfer function of the FIG. 8 circuit.

Figure 9:
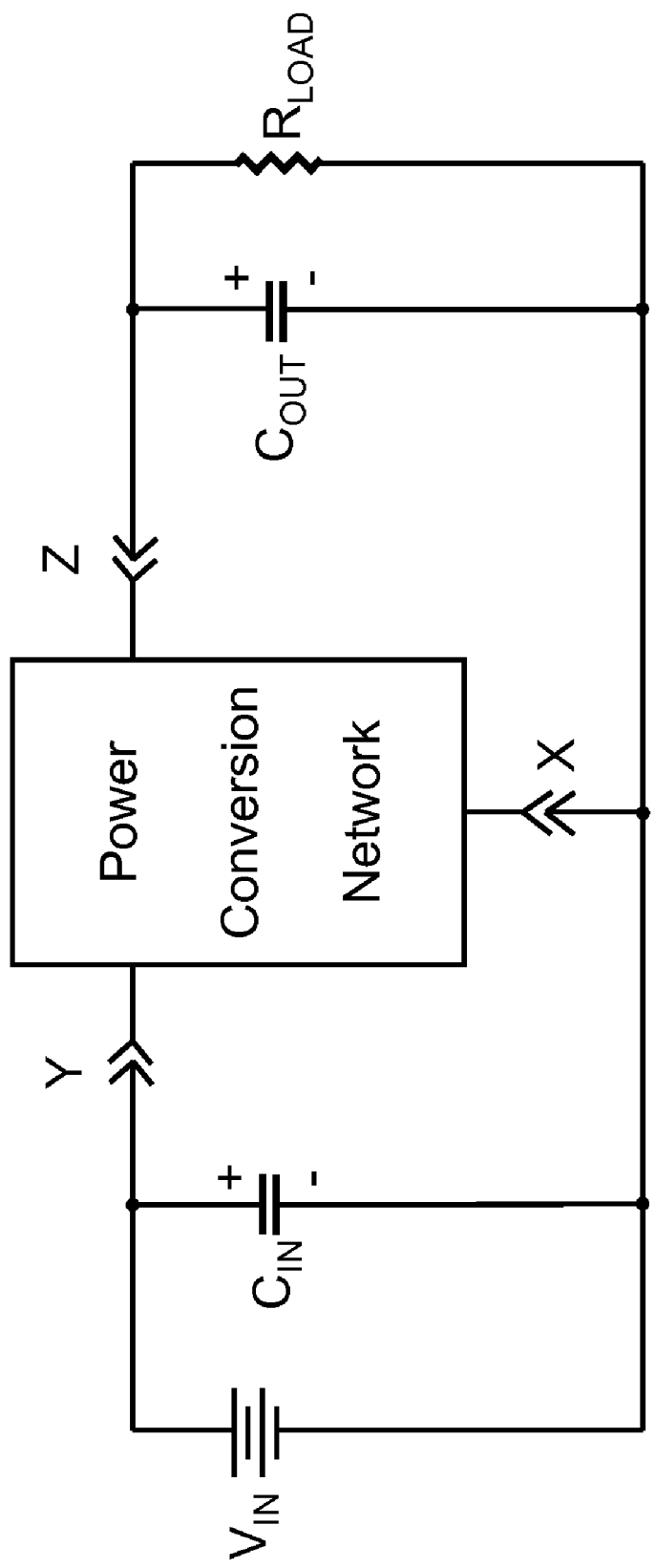
FIG. 9 illustrates the power conversion network of FIG. 5 configured to form a tapped inductor buck converter for small step down ratio applications according to the subject invention.

FIG. 9, which is another embodiment of the subject invention, illustrates a buck or step down converter for small step down ratios. For FIG. 9 $V_Y=V_{IN}$, $V_X=0$, and $V_Z=V_{OUT}$. Making these substitutions into equation (1) yields $$V_{OUT} = V_{IN} + \frac{D(0 - V_{IN})}{(1+n)}.$$

Solving for $V_{OUT}$ yields $$V_{OUT} = \frac{(1+n-D)V_{IN}}{(1+n)},$$

but D refers to the duty cycle of the $S_1$ switch. In common practice in a buck converter D refers to the duty cycle of the upper main buck switch, which is $S_3$ in FIG. 9, so that, to be consistent with common practice we will define D' to be the duty cycle for the $S_3$ switch in FIG. 9, which requires that we replace D with (1−D'), which changes the transfer function for FIG. 9 to $$V_{OUT} = \frac{(n+D')V_{IN}}{(1+n)},$$

where D' refers to the duty cycle of the $S_3$ switch.

Figure 10:
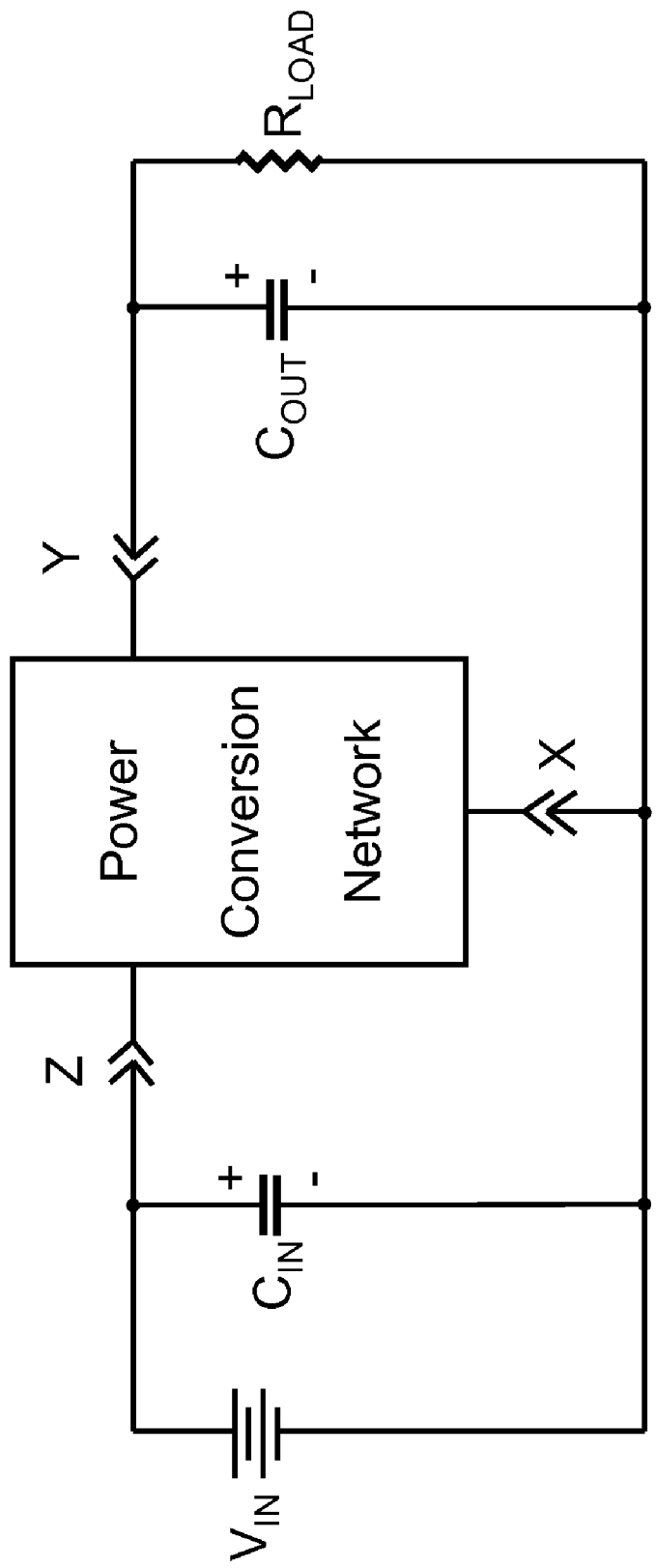
FIG. 10 illustrates the power conversion network of FIG. 5 configured to form a tapped inductor boost converter for small step up ratio applications according to the subject invention.

FIG. 10, which is another embodiment of the subject invention, illustrates a boost or step up converter for small step up ratios. For FIG. 10 $V_Z=V_{IN}$, $V_X=0$, and $V_Y=V_{OUT}$. Making the substitutions into equation (1) yields $$V_{IN} = V_{OUT} + \frac{D(0 - V_{OUT})}{(1+n)}$$

for the FIG. 10 transfer function. Solving for $V_{OUT}$ yields $$V_{OUT} = \frac{(1+n)V_{IN}}{(1+n-D)}$$

for FIG. 10.

Figure 11:
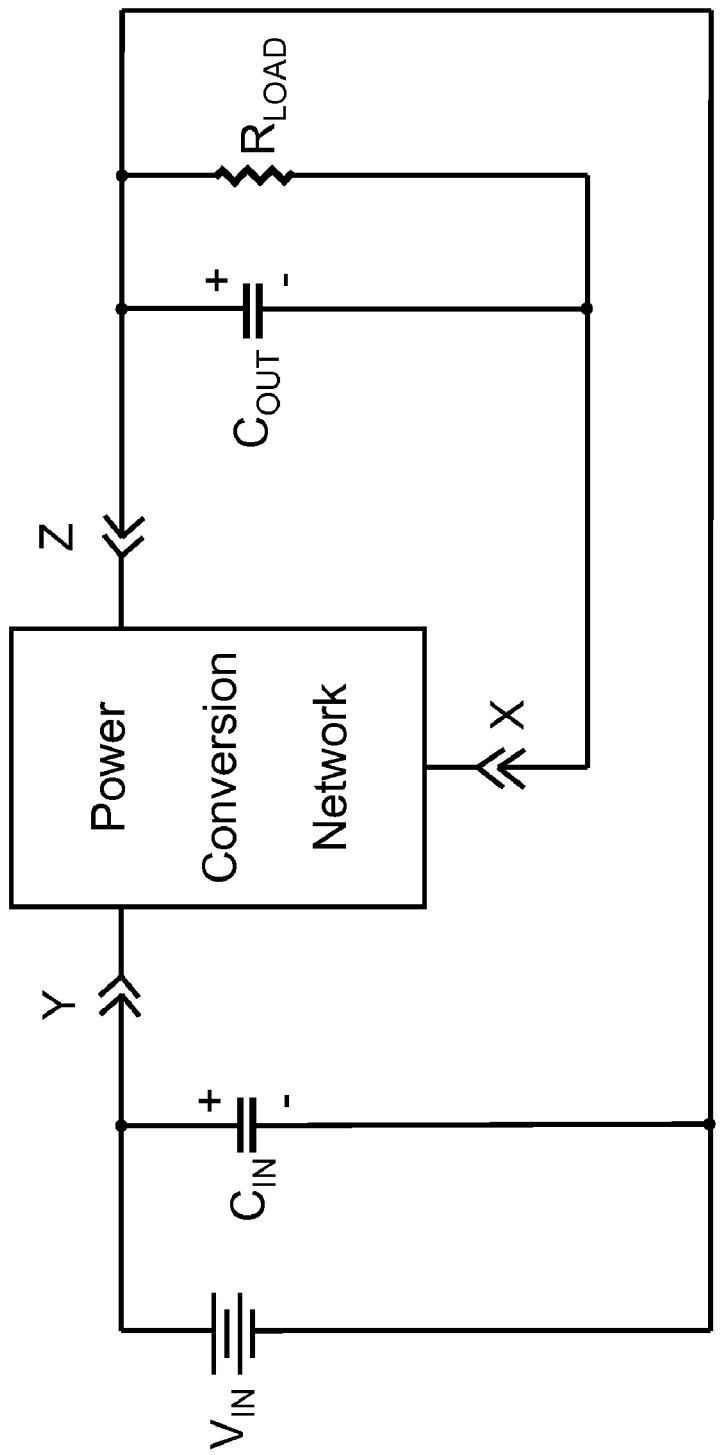
FIG. 11 illustrates the power conversion network of FIG. 5 configured to form a tapped inductor buck boost converter for large step up ratio inverting applications according to the subject invention.

FIG. 11, which is another embodiment of the subject invention, illustrates a buck boost or non-isolated flyback for small step up or step down ratios. The buck boost is an inverting power converter so that the output voltage will always have the opposite sign from the input voltage. For FIG. 11 $V_Y=V_{IN}$, $V_Z=0$, and $V_X=V_{OUT}$. Making the substitutions into equation (1) yields $$V_{OUT} = \frac{(D-1-n)V_{IN}}{D}.$$

The main switch in a buck boost is the upper switch, which in this case would be $S_3$, so we will replace D with (1−D'), which changes the transfer function for FIG. 11 to $$V_{OUT} = \frac{-(n+D')V_{IN}}{(1-D')},$$

where D' refers to the duty cycle of the $S_3$ switch.

Figure 12:
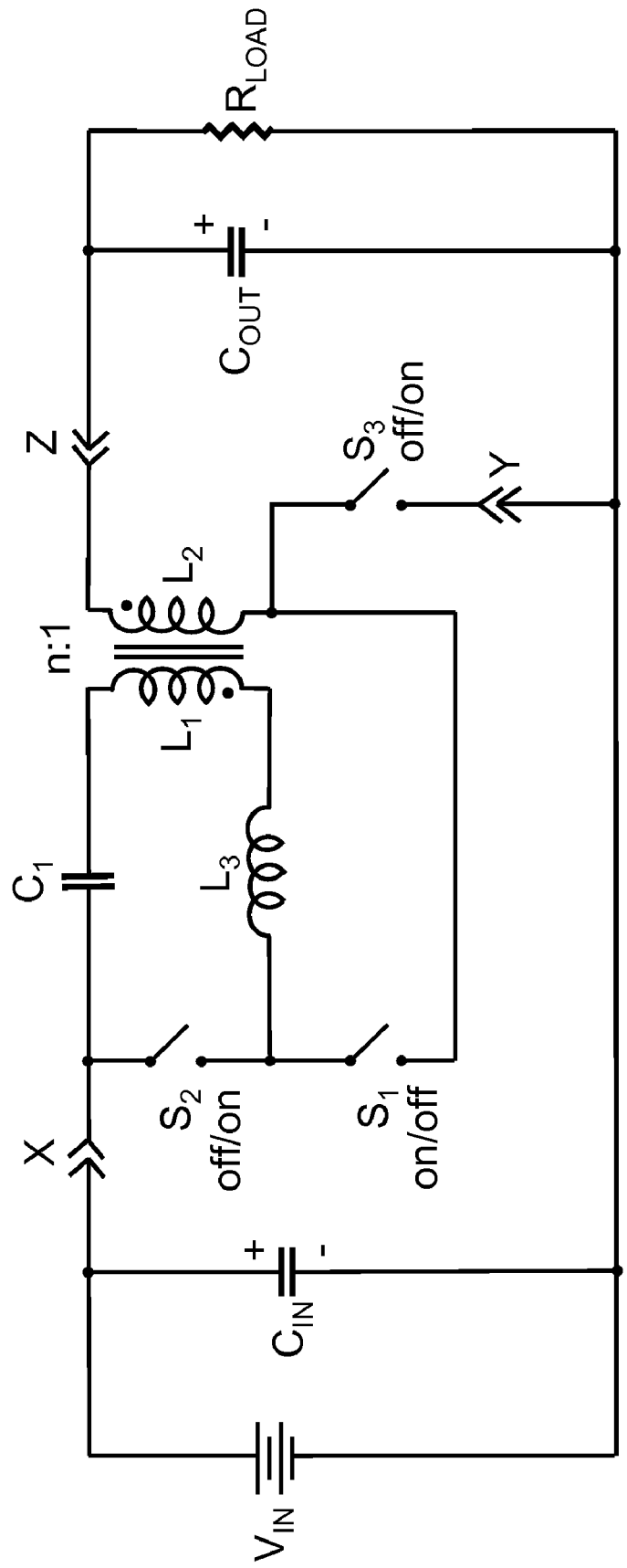
FIG. 12 illustrates the circuit of FIG. 3 and the power conversion network of FIG. 5 with an uncoupled inductance added in series with the $L_1$ winding to form a tapped inductor buck converter with a zero voltage switching mechanism according to the subject invention.
Figure 13:
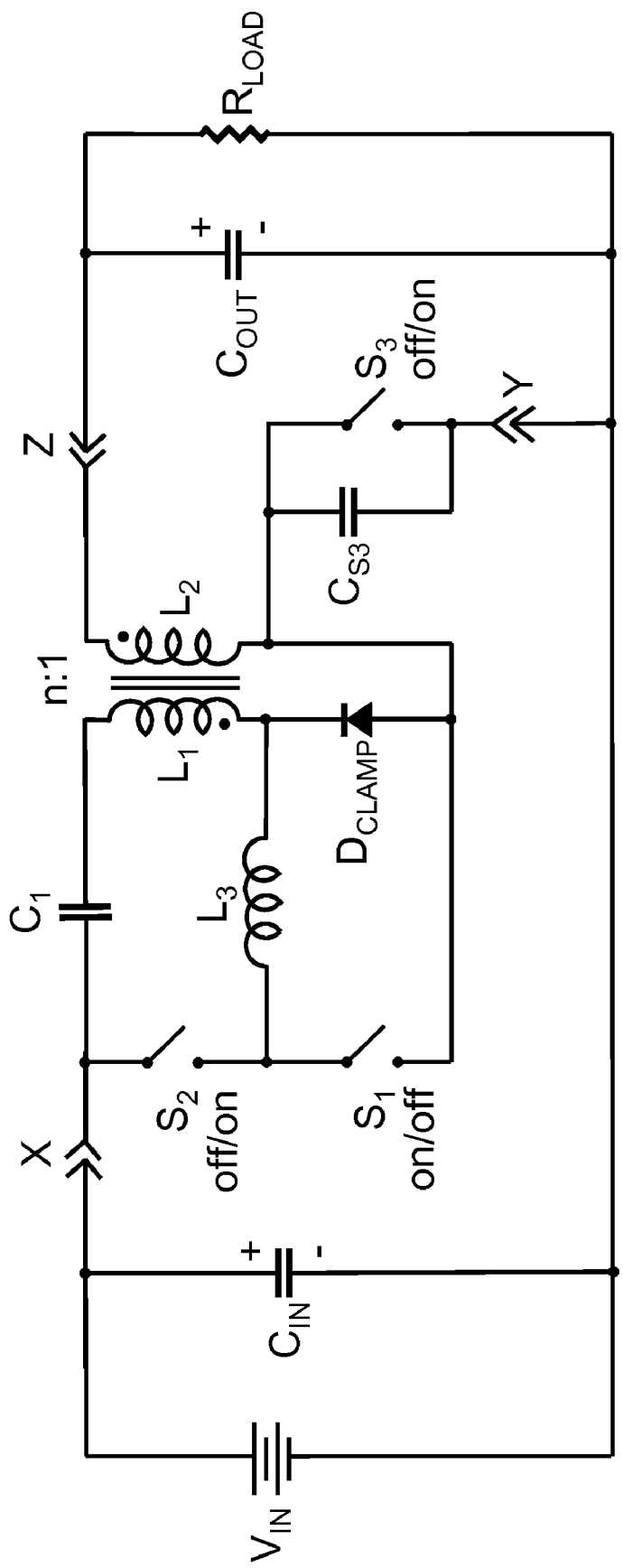
FIG. 13 illustrates the FIG. 12 circuit with a clamp diode added to eliminate ringing associated with the series inductance $L_3$ and the intrinsic capacitance, $C_{S3}$, of $S_3$ according to the subject invention.
Figure 14:
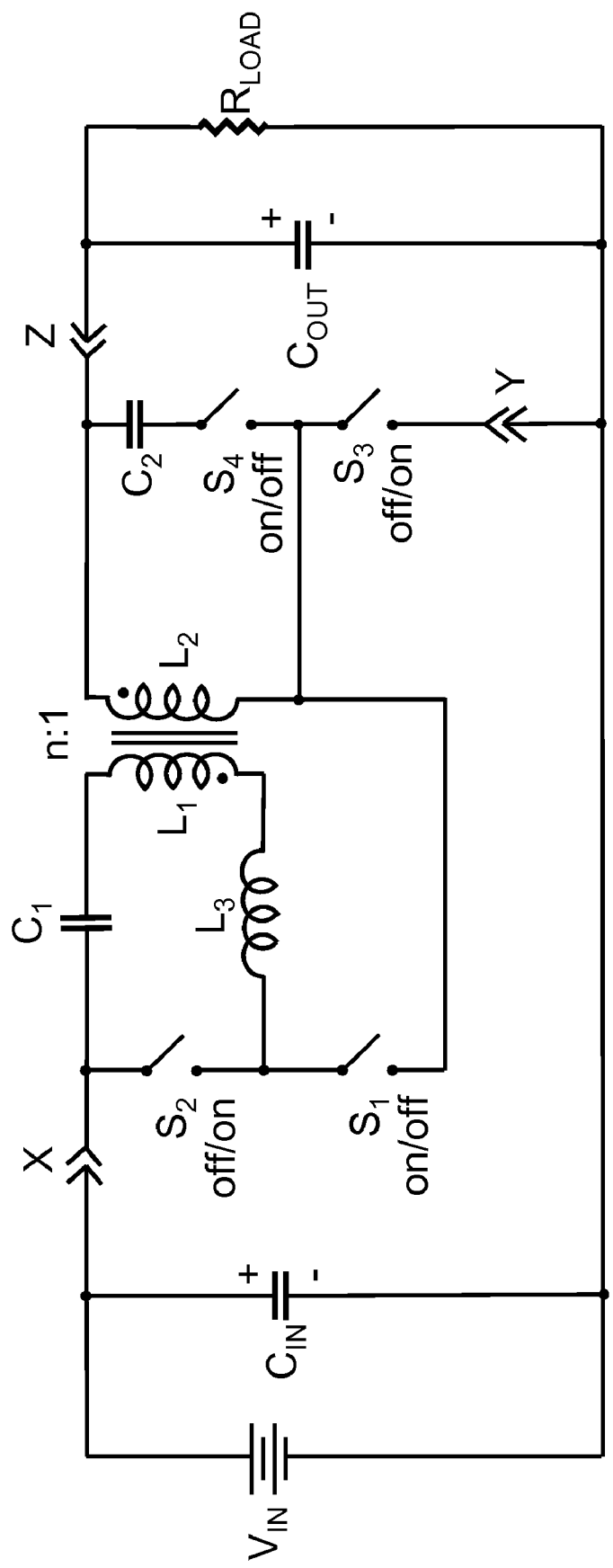
FIG. 14 illustrates the FIG. 12 circuit with an active clamp network added to eliminate ringing associated with the series inductance $L_3$ and the intrinsic capacitance of $S_3$ according to the subject invention.

FIG. 12, which is another embodiment of the subject invention, illustrates the power conversion network of FIG. 5 used to form a buck converter for large step down ratios, but with an inductance $L_3$ added in series with the $L_1$ winding. $L_3$ may be a separate and distinct discrete inductor or $L_3$ may be the leakage inductance of the coupled inductor referred to the $L_1$ winding side of the coupled inductor. $L_3$ can have the beneficial effect of storing energy to drive a zero voltage turn on transition of the converter's main switch, which, in this case, would be $S_1$. If $L_3$ is a separate and distinct discrete inductor, then ringing associated with $L_3$ and the intrinsic capacitance of $S_3$ can be clamped by a diode, $D_{CLAMP}$, as illustrated in FIG. 13, which is another embodiment of the subject invention. If $L_3$ is a leakage inductance of the coupled inductor then ringing associated with $L_3$ can be clamped and eliminated by using an active clamp network comprised of $S_4$ and $C_2$, as illustrated in FIG. 14, which is another embodiment of the subject invention. The $S_4$ switch is operated in synchronization with the switch $S_1$ in order to provide clamping during the on time of $S_1$ when it is needed. The capacitor $C_2$ effectively parallels the $C_{S3}$ capacitor and swamps its effect by lowering the resonance frequency to a frequency much smaller than the converters switching frequency so that the variation in voltage of $C_2$ is small during its operation, i.e. while the switch $S_4$ is conducting. The FIG. 14 power conversion network has an advantage over the FIG. 13 network in that any ringing associated with leakage inductance is fully clamped. Even with the clamp diode $D_{CLAMP}$ of the FIG. 13 circuit there will still be some leakage inductance which is unclamped in the FIG. 13 network. Also, by using the leakage inductance to achieve zero voltage switching a second magnetic circuit element for that same purpose is obviated.

Figure 15:
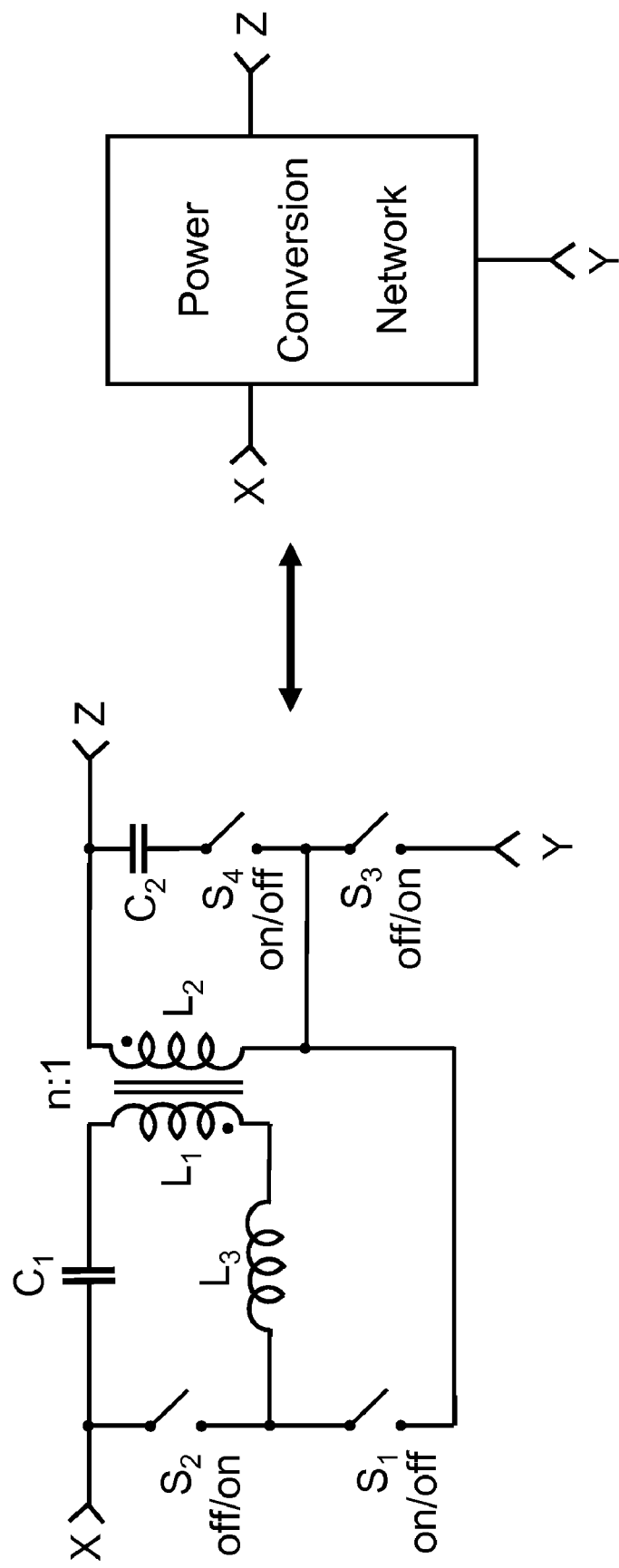
FIG. 15 illustrates a fully clamped zero voltage switching tapped inductor power conversion network according to the subject invention.
Figure 16:
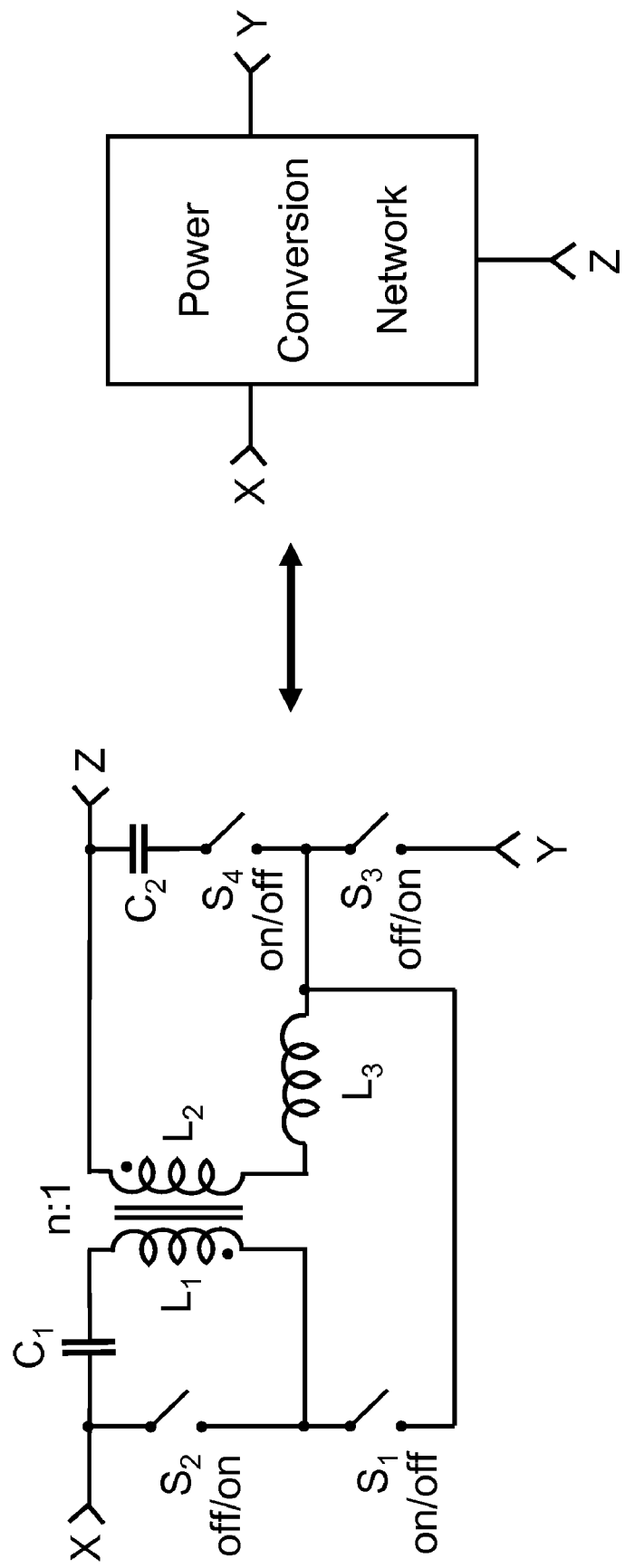
FIG. 16 illustrates a fully clamped zero voltage switching tapped inductor power conversion network with an alternate series inductance connection that is equivalent to the power conversion network of FIG. 15 according to the subject invention.

The components contained within the X, Y, and Z terminals of FIGS. 12, 13, and 14 constitute power conversion networks which can be used to form converters similar to those described above and illustrated in FIGS. 6 through 11, but with the added benefit of zero voltage switching. FIG. 15, which is another embodiment of the subject invention, is an example of one of these power conversion networks, which was derived from FIG. 14. It is also possible to place an inductor in series with the $L_2$ winding as an alternative to the placement illustrated in FIGS. 12 through 15, as illustrated in FIG. 16, which is another embodiment of the subject invention. The FIG. 16 placement offers no advantage or disadvantage and the operation of the FIG. 16 network is essentially identical to the operation of the power conversion network illustrated in FIG. 15.

Figure 17:
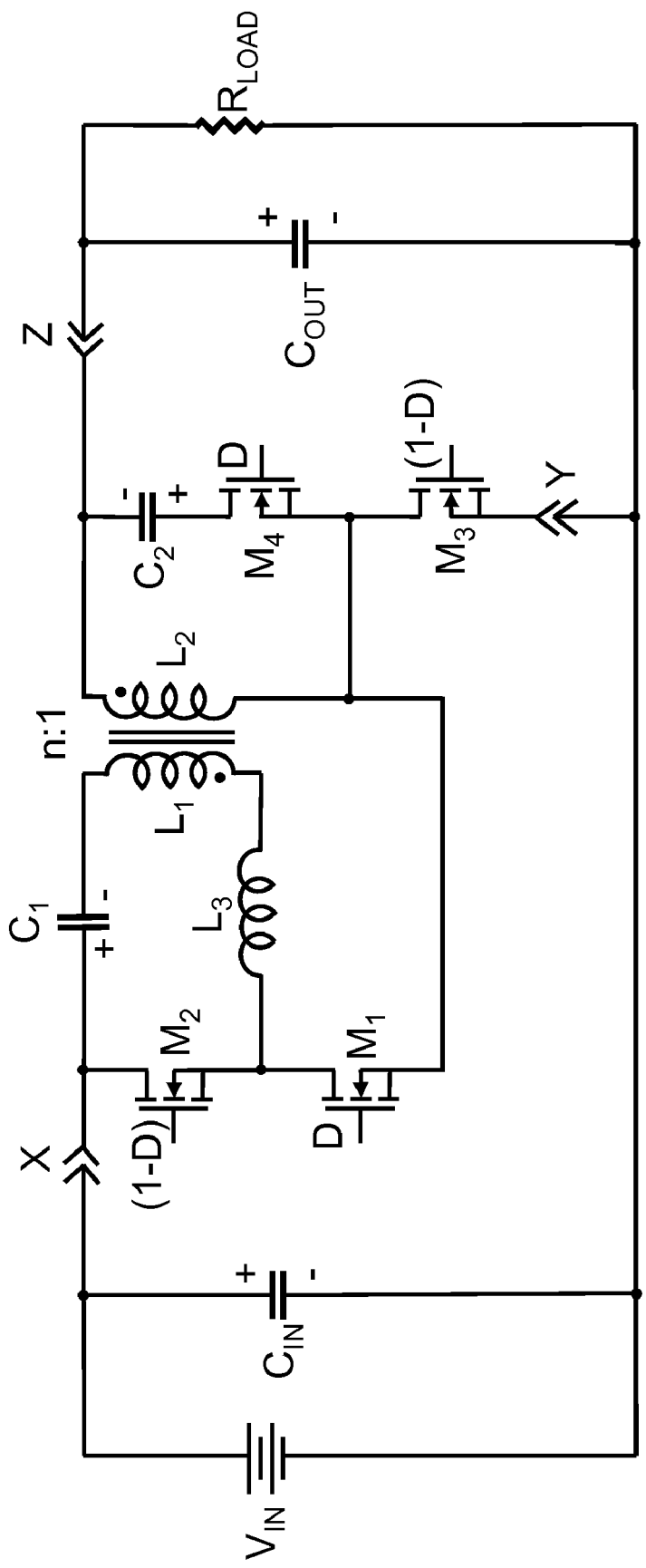
FIG. 17 illustrates the power conversion network of FIG. 15 applied to form a large step down ratio fully clamped zero voltage switching tapped inductor buck converter according to the subject invention.
Figure 18:
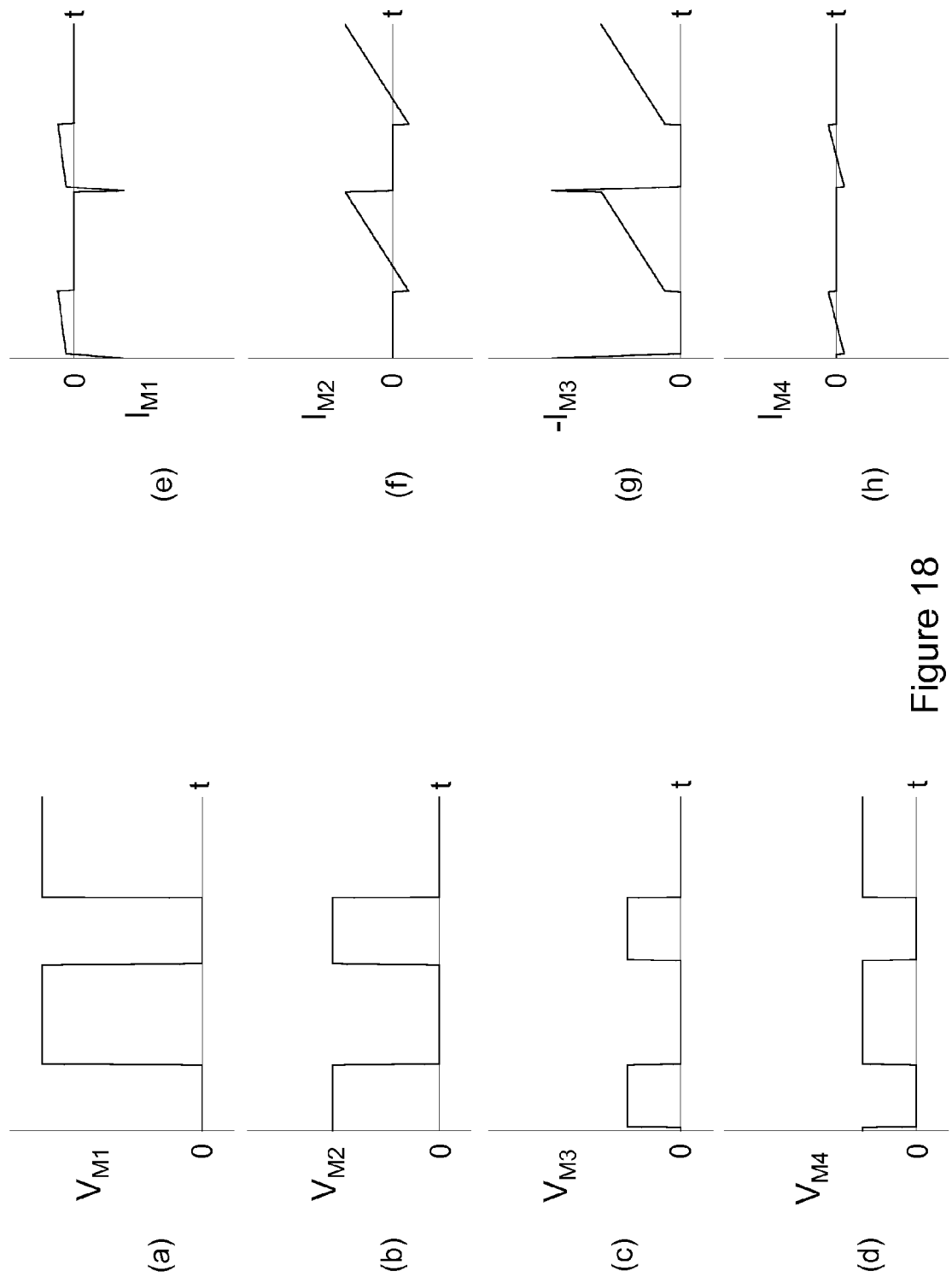
FIG. 18((f) illustrates the current wave form of the $M_2$ switch of the FIG. 17 circuit according to the subject invention.

FIG. 17, which is another embodiment of the subject invention, is a fully clamped minimum voltage tapped inductor buck converter based on the FIG. 15 power conversion network. The transfer function for the FIG. 17 circuit is the same as the transfer function for the FIG. 3 circuit. The current wave forms of the FIG. 17 circuit are different from the wave forms for the hard switching circuit illustrated in FIG. 3, as illustrated in FIGS. 18(a) through 18(h). The only significant differences are small timing delays and some small differences that appear in the current wave forms which are effected by the presence of the series inductance $L_3$.

Figure 19:
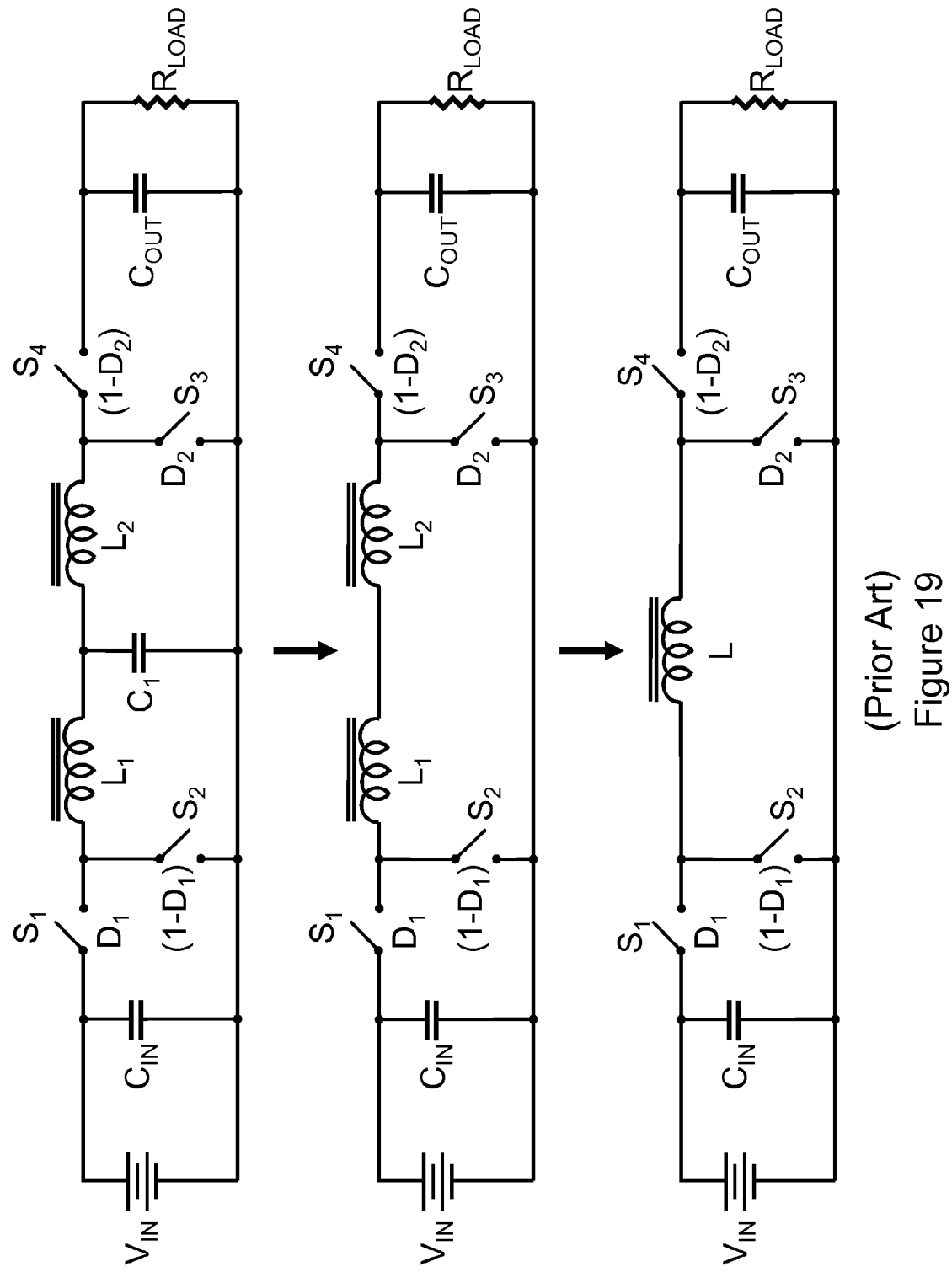
FIG. 19 illustrates the transformation of a buck converter followed by a boost converter into a four switch dual modulator SEPIC according to the prior art.
Figure 20:
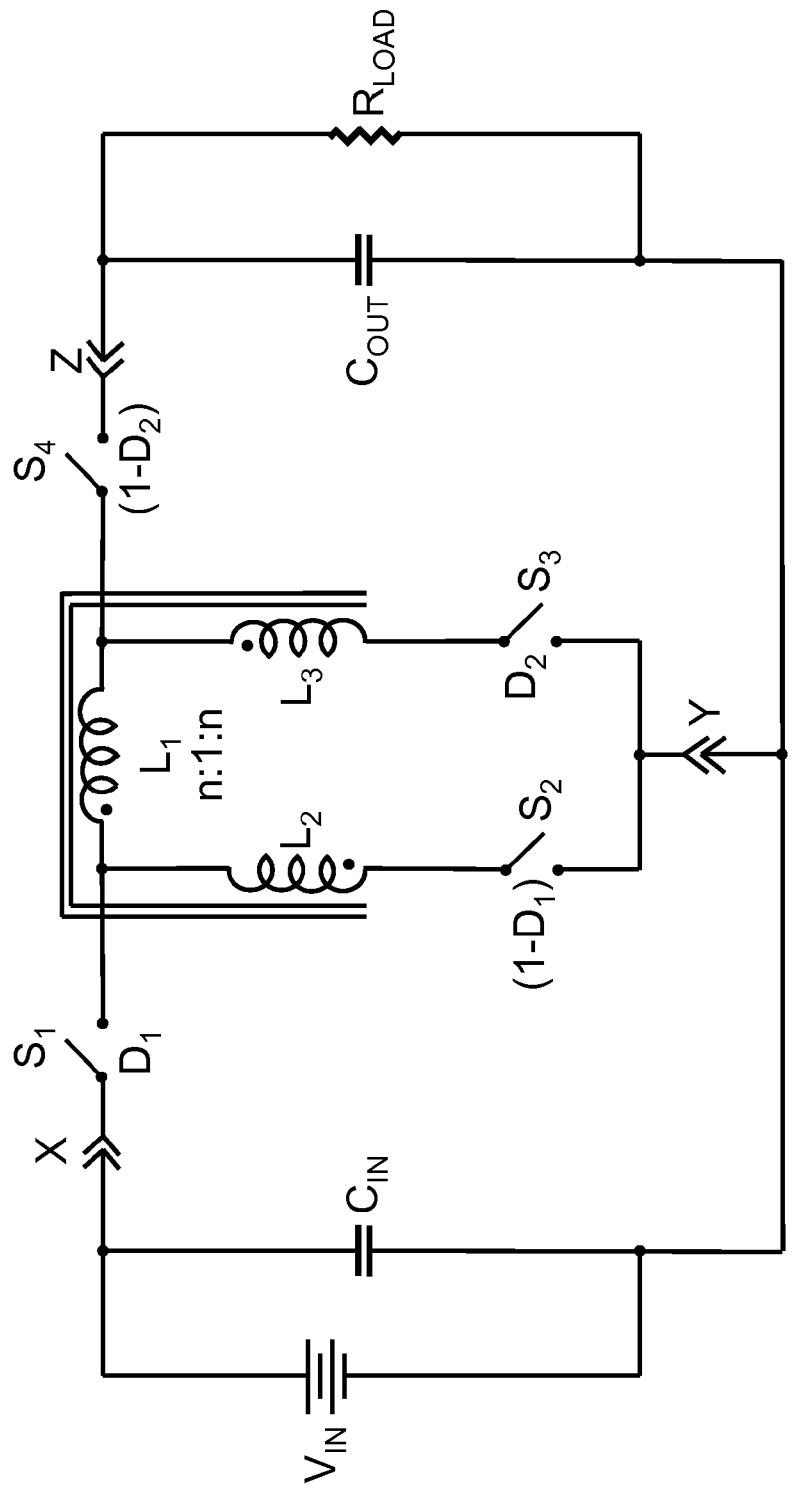
FIG. 20 illustrates a tapped inductor four switch dual modulator SEPIC for small step up and step down ratios according to the subject invention.

FIG. 20, which is another embodiment of the subject invention, illustrates a four switch dual modulator tapped inductor SEPIC for small step up and small step down voltage ratios. The SEPIC has been shown to be a cascade combination of a simple buck converter followed by a simple boost converter with the output inductor of the buck converter combined with the input inductor of the boost converter, as illustrated in FIG. 19. FIG. 20 combines a winding of a tapped inductor buck converter with a winding of a tapped inductor boost converter to form a SEPIC with a single tapped inductor with three windings. Referring to FIG. 20, $S_1$, $S_2$, $L_1$, and $L_2$ would, by themselves, form a tapped inductor buck converter for small step down ratios. Again, referring to FIG. 20, $S_3$, $S_4$, $L_1$, and $L_3$ would, by themselves, form a tapped inductor boost converter for small step up ratios. In FIG. 20 $L_1$ is shared between the buck stage and the boost stage and all windings occupy a common core. In operation when the input voltage is higher than the output voltage the duty cycle of $S_4$ is 100%, the duty cycle of $S_3$ is 0%, and $S_1$ and $S_2$ are modulated to regulate the output voltage, as in a conventional buck converter. When the input voltage is equal to the output voltage, the $S_1$ and $S_4$ switches have a duty cycle of 100% and the $S_2$ and $S_3$ switches have a duty cycle of 0%. When the input voltage is lower than the output voltage the duty cycle of the $S_1$ switch is 100%, the duty cycle of the $S_2$ switch is 0%, and the $S_3$ and $S_4$ switches are modulated to achieve the desired output voltage. Contained within the FIG. 20 circuit is a three terminal power conversion network (canonical cell) defined by the terminals X, Y, and Z. The three terminal power conversion network can be used to form a SEPIC, but it can also be used to form other converter types, different than the SEPIC, by changing the connections of the X, Y, and Z terminals to line, load, and common.

In the FIG. 20 circuit a first terminal of a dc source of voltage and power $V_{IN}$ is connected to a first terminal of a capacitor $C_{IN}$ and to an X terminal of a power conversion network. A second terminal of $V_{IN}$ is connected to a second terminal of capacitor $C_{IN}$, a terminal Y of the power conversion network, a first terminal of a capacitor $C_{OUT}$, and a first terminal of a load $R_{LOAD}$. The X terminal is connected to a first terminal of a switch $S_1$. A second terminal of switch $S_1$ is connected to a dotted terminal of a winding $L_1$ of a coupled inductor and to an undotted terminal of a winding $L_2$ of the coupled inductor. A dotted terminal of winding $L_2$ is connected to a first terminal of a switch $S_2$. A second terminal of switch $S_2$ is connected to the Y terminal of the power conversion network and to a first terminal of a switch $S_3$. A second terminal of switch $S_3$ is connected to an undotted terminal of a winding $L_3$ of the coupled inductor. A dotted terminal of winding $L_3$ is connected to an undotted terminal of winding $L_1$ and to a first terminal of a switch $S_4$. A second terminal of switch $S_4$ is connected to a Z terminal of the power conversion network. The Z terminal of the power conversion network is connected to a second terminal of capacitor $C_{OUT}$ and to a second terminal of load $R_{LOAD}$.

In operation the FIG. 20 has three operating modes, determined by the input voltage and output voltage. In all three modes the input and output voltages have the same sign or polarity. In a first mode of operation the input voltage is larger in magnitude than the output voltage. In the first mode of operation there are two operating states separated by brief transition times between the two operating states. In a first operating state of the first operating mode switches $S_1$ and $S_4$ are on (conducting) and switches $S_2$ and $S_3$ are off (non-conducting). During the first operating state of the first operating mode current flows from $V_{IN}$ to terminal X, through $S_1$, through $L_1$, through $S_4$, through terminal Z, to load $R_{LOAD}$, and returns to $V_{IN}$. During the first operating state of the first operating mode stored magnetic energy ramps up in the coupled inductor and magnetizing current ramps up in $L_1$. In a second operating state of the first operating mode switches $S_2$ and $S_4$ are on and switches $S_1$ and $S_3$ are off. During the second operating state of the first operating mode magnetic energy stored in the coupled inductor ramps down and provides power to the load. During the second operating state of the first operating mode, current flows in a loop containing $S_2$, $L_2$, $L_1$, $S_4$, terminal Z, load $R_{LOAD}$, and terminal Y in a clockwise direction in the loop. The current during the second operating state of the first operating mode is significantly less than the current during the first operating state of the first operating mode due to the fact that current flows through two windings during the second operating state of the first operating mode. During the second operating state of the first operating mode current ramps down in magnitude. The circuit's voltage and current wave forms are illustrated in FIGS. 21(a) through 21(h) for the first operating mode. At the end of the second operating state of the first operating mode switch $S_2$ is turned off and the cycle begins again.

A second operating mode occurs when the input voltage is equal to the output voltage. In the second operating mode there is one operating state. In the second operating mode switches $S_1$ and $S_4$ are on and switches $S_2$ and $S_3$ are off. Current flows from $V_{IN}$ to $R_{LOAD}$ through terminals X and Z, through switches $S_1$ and $S_4$, and through winding $L_1$. In the second operating mode there is no change in current and there is no change in the stored magnetic energy in the coupled inductor.

A third operating mode occurs when the input voltage magnitude is less than the output voltage magnitude. The third operating mode has two operating states. In a first operating state of the third operating mode switches $S_1$ and $S_3$ are on and switches $S_2$ and $S_4$ are off. During the first operating state of the third operating mode current flows from $V_{IN}$ through terminal X, through $S_1$, $L_1$, $L_2$, $S_3$, and terminal Y back to $V_{IN}$. During the first operating state of the third operating mode stored magnetic energy ramps up in the coupled inductor. During the first operating state of the third operating mode current ramps up in the $L_1$ and $L_3$ windings. At the end of the first operating state of the third operating mode switch $S_3$ is turned off. At the beginning of a second operating state of the third operating mode switch $S_4$ is turned on. During the second state of the third operating mode current ramps down in $L_1$ and the stored magnetic energy in the coupled inductor ramps down. The current during the second operating state of the third operating mode is significantly larger than the current during the first operating state of the third operating mode since the current flows in only one winding during the second operating state of the third operating mode. Current and voltage wave forms for the third operating mode are illustrated in FIGS. 22(a) through 22(h). At the end of the second operating state of the third operating mode switch $S_4$ is turned off and the cycle repeats.

Figure 23:
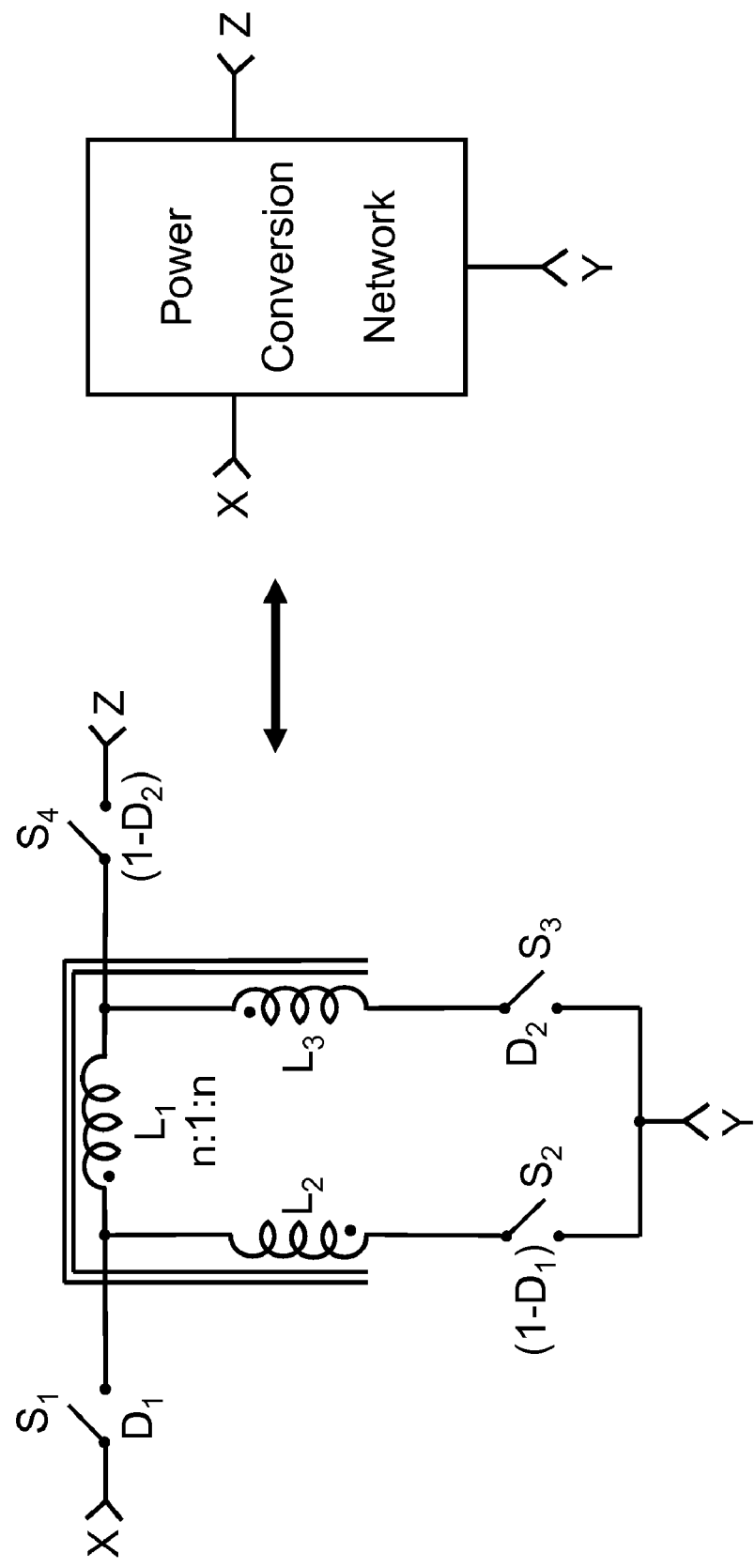
FIG. 23 illustrates a power conversion network based on the FIG. 19 circuit which can be used to form a variety of power conversion circuits according to the subject invention.

FIG. 23, which is another embodiment of the subject invention, illustrates the power conversion network which forms a part of the SEPIC of FIG. 20. The FIG. 23 power conversion network is a canonical cell which can be used to form converter types other than the SEPIC merely by changing the connections between the X, Y, and Z terminals and line, load, and ground. A transfer function for the FIG. 23 power conversion network can be formed based on the X, Y, and Z terminal voltages. There are three transfer functions for the FIG. 23 network. There is a different transfer function for each operating mode. For the first operating mode the transfer function is $$(V_X - V_Z)D_1 = \frac{(V_Z - V_Y)(1 - D_1)}{(1+n)} \quad (2)$$

where $D_1$ is the duty cycle of switch $S_1$ and n is the turns ratio of winding $L_2$ to winding $L_1$. For the second operating mode the transfer function is $$V_X = V_Z \quad (3)$$

and for the third operating mode the transfer function is $$\frac{(V_X - V_Y)D_2}{(1+n)} = (V_Z - V_X)(1 - D_2) \quad (4)$$

where $D_2$ is the duty cycle of switch $S_3$ and n is the turns ratio of winding $L_3$ to winding $L_1$. For the FIG. 20 circuit $V_X = V_{IN}$, $V_Y = 0$, and $V_Z = V_{OUT}$. Making these substitutions in equations (2), (3), and (4) yields $$V_{OUT} = \frac{(1+n)D_1 V_{IN}}{(1+nD_1)}$$

for the transfer function of the first operating mode, $V_{OUT} = V_{IN}$, for the transfer function of the second operating mode, and $$V_{OUT} = \frac{(1+n-nD_2)V_{IN}}{(1-D_2)(1+n)}$$

for the transfer function of the third operating mode.

Figure 24:
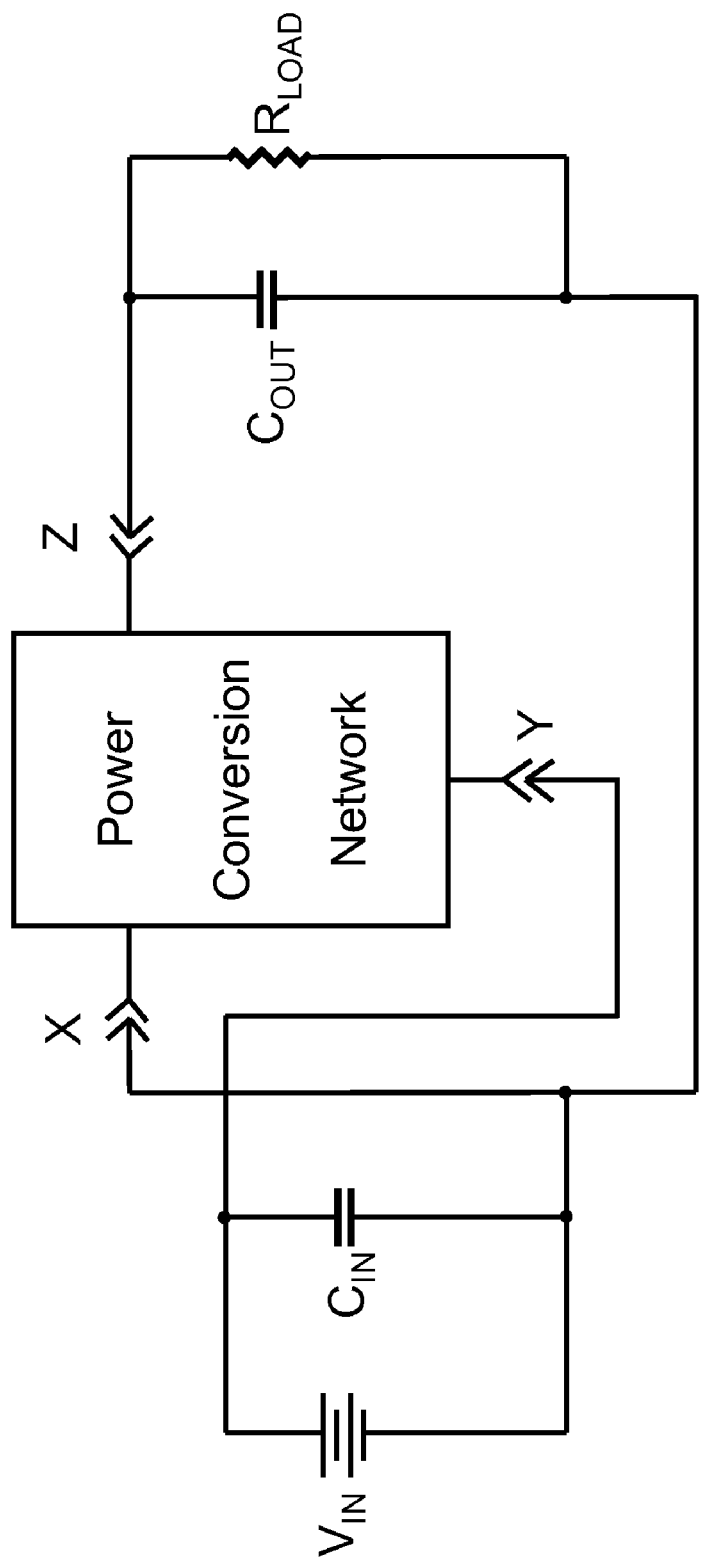
FIG. 24 illustrates the power conversion network of FIG. 23 connected to form a four quadrant converter for large step down ratios according to the subject invention.

FIG. 24, which is another embodiment of the subject invention, illustrates the power conversion network of FIG. 23 connected to form a four quadrant converter for large step down ratios. For the FIG. 24 circuit $V_X = 0$, $V_Y = V_{IN}$, and $V_Z = V_{OUT}$. Making these substitutions into equations (2), (3), and (4) yields $$V_{OUT} = \frac{(1-D_1)V_{IN}}{(1+nD_1)}$$

for the transfer function of the first operating mode, $V_{OUT} = 0$ for the transfer function of the second operating mode, and $$V_{OUT} = \frac{-D_2 V_{IN}}{(1+n)(1-D_2)}$$

for the transfer function of the third operating mode.

Figure 21:
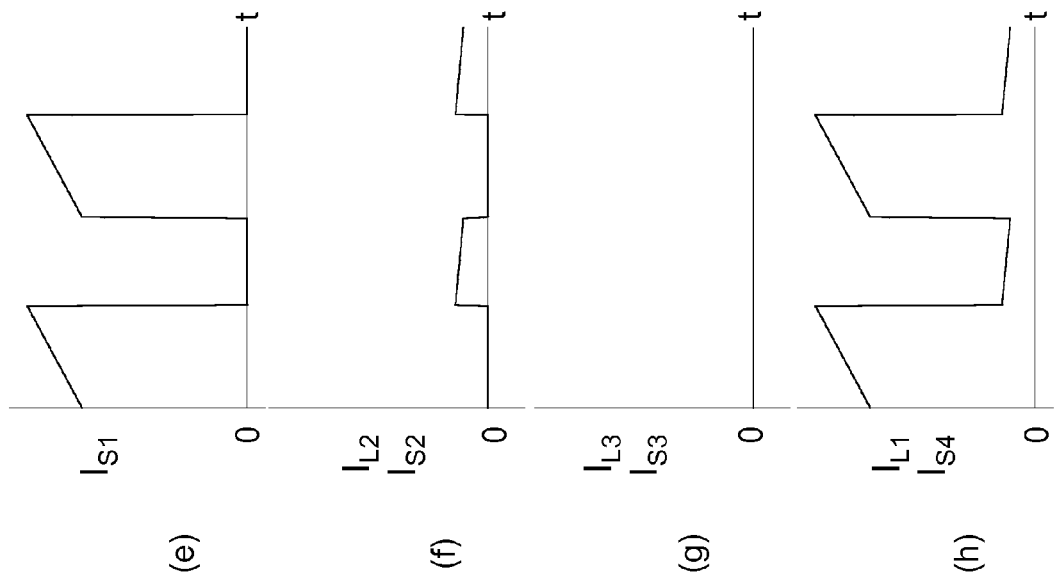
FIG. 21(a) illustrates the voltage wave form of the $S_1$ switch of the FIG. 20 circuit for the condition in which the input voltage is larger than the output voltage according to the subject invention.
FIG. 21(b) illustrates the voltage wave form of the $S_2$ switch of the FIG. 20 circuit for the condition in which the input voltage is larger than the output voltage according to the subject invention.
FIG. 21(c) illustrates the voltage wave form of the $S_3$ switch of the FIG. 20 circuit for the condition in which the input voltage is larger than the output voltage according to the subject invention.
FIG. 21(d) illustrates the voltage wave form of the $S_4$ switch of the FIG. 20 circuit for the condition in which the input voltage is larger than the output voltage according to the subject invention.
FIG. 21(e) illustrates the current wave form of the $S_1$ switch of the FIG. 20 circuit for the condition in which the input voltage is larger than the output voltage according to the subject invention.
FIG. 21(f) illustrates the current wave form of the $S_2$ switch and the $L_2$ winding of the FIG. 20 circuit for the condition in which the input voltage is larger than the output voltage according to the subject invention.
FIG. 21(g) illustrates the current wave form of the $S_3$ switch and the $L_3$ winding of the FIG. 20 circuit for the condition in which the input voltage is larger than the output voltage according to the subject invention.
FIG. 21(h) illustrates the current wave form of the $S_4$ switch and the $L_1$ winding of the FIG. 20 circuit for the condition in which the input voltage is larger than the output voltage according to the subject invention.
Figure 21:
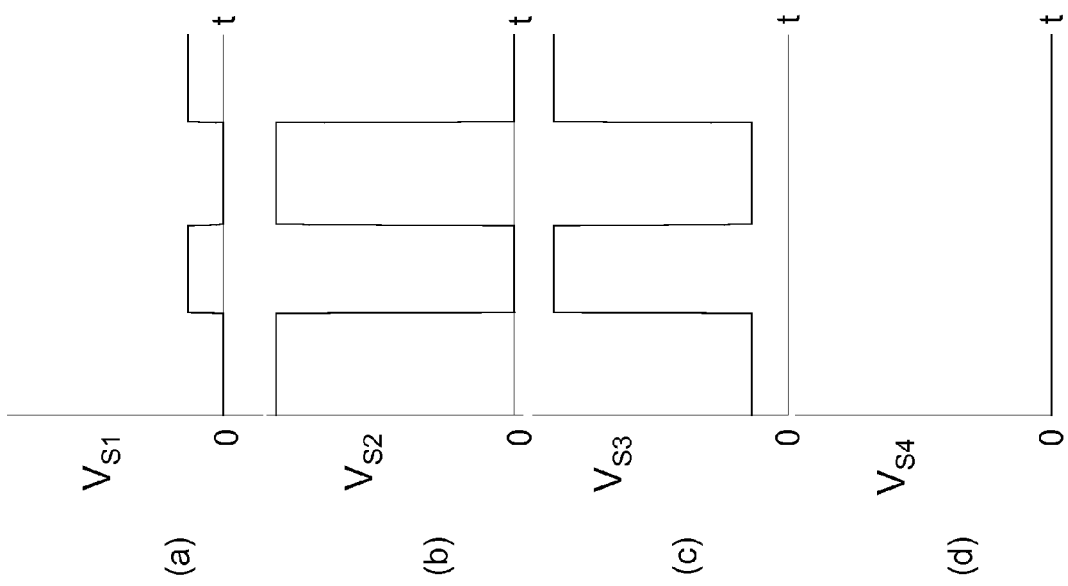
Figure 22:
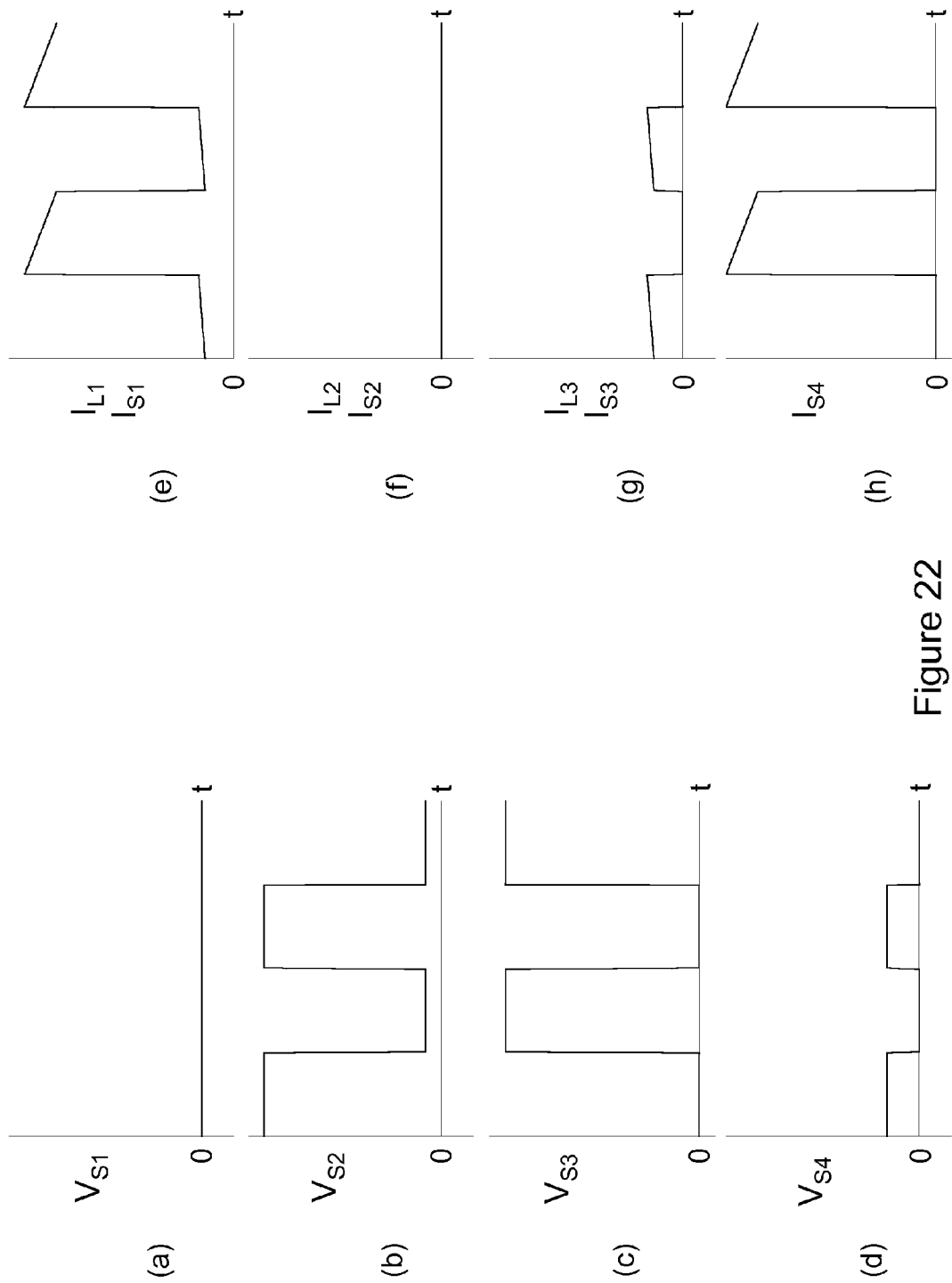
FIG. 22(a) illustrates the voltage wave form of the $S_1$ switch of the FIG. 20 circuit for the condition in which the input voltage is smaller than the output voltage according to the subject invention.
FIG. 22(b) illustrates the voltage wave form of the $S_2$ switch of the FIG. 20 circuit for the condition in which the input voltage is smaller than the output voltage according to the subject invention.
FIG. 22(c) illustrates the voltage wave form of the $S_3$ switch of the FIG. 20 circuit for the condition in which the input voltage is smaller than the output voltage according to the subject invention.
FIG. 22(d) illustrates the voltage wave form of the $S_4$ switch of the FIG. 20 circuit for the condition in which the input voltage is smaller than the output voltage according to the subject invention.
FIG. 22(e) illustrates the current wave form of the $S_1$ switch and the $L_1$ winding of the FIG. 20 circuit for the condition in which the input voltage is smaller than the output voltage according to the subject invention.
FIG. 22(f) illustrates the current wave form of the $S_2$ switch and the $L_2$ winding of the FIG. 20 circuit for the condition in which the input voltage is smaller than the output voltage according to the subject invention.
FIG. 22(g) illustrates the current wave form of the $S_3$ switch and the $L_3$ winding of the FIG. 20 circuit for the condition in which the input voltage is smaller than the output voltage according to the subject invention.
FIG. 22(h) illustrates the current wave form of the $S_4$ switch of the FIG. 20 circuit for the condition in which the input voltage is smaller than the output voltage according to the subject invention.
Figure 25:
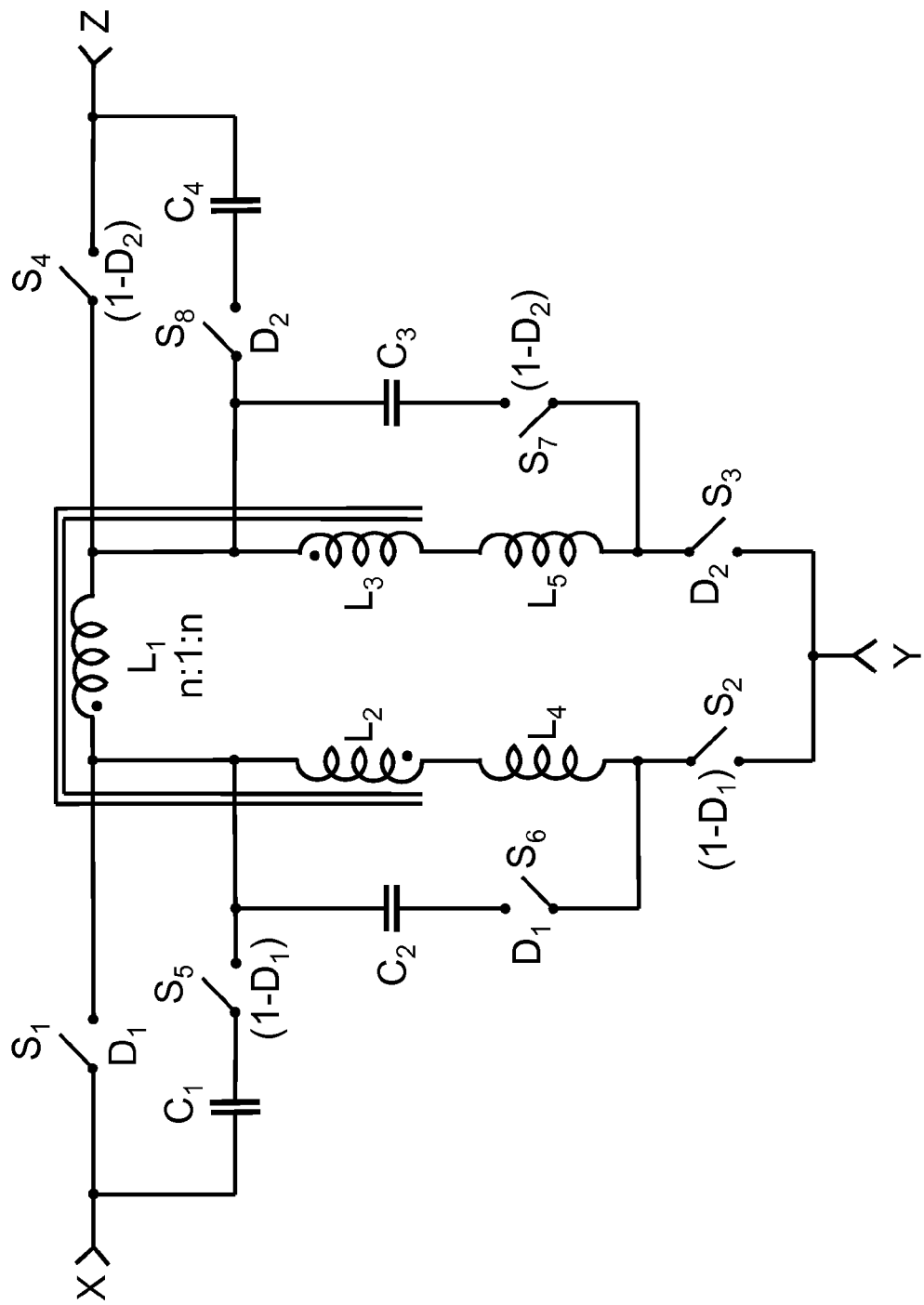
FIG. 25 illustrates the power conversion network of FIG. 23 with inductances added in series with $L_2$ and $L_3$ in order to achieve zero voltage switching and active clamp networks added to fully clamp each winding of the network according to the subject invention.

FIG. 25, which is another embodiment of the subject invention, illustrates the power conversion network of FIG. 23 with an inductance placed in series with the $L_2$ winding and an inductance placed in series with the $L_3$ winding and with active clamp networks added to fully clamp every winding of the network during every operating state. The series inductances may be either discrete inductors or they may be leakage inductances of the coupled inductor. The series inductances provide a magnetic energy storage mechanism which can be used for achieving zero voltage switching for all switching transitions. $S_5$ and $C_1$ form a first active clamp network for eliminating ringing associated with the $L_1$ winding when $S_1$ is off, $S_6$ and $C_2$ form a second active clamp network for eliminating ringing associated with the $L_2$ and $L_4$ windings when $S_2$ is off, $S_7$ and $C_3$ form an active clamp network for eliminating ringing associated with the $L_3$ and $L_5$ windings when $S_3$ is off, and $S_8$ and $C_4$ form an active clamp network for eliminating ringing associated with the $L_1$ winding when $S_4$ is off. The transfer functions for the FIG. 25 power conversion network are the same as the transfer functions for the FIG. 23 network. In practice, the voltage wave forms are nearly identical to those for the FIG. 23 network, as illustrated in FIGS. 21 and 22, but the current wave forms are altered to form ramps of higher slope due to the effects of the series inductances. The differences in the current wave forms between the FIG. 23 and FIG. 25 networks are similar to the differences in the current wave forms between the FIG. 5 and FIG. 16 networks.

Figure 26:
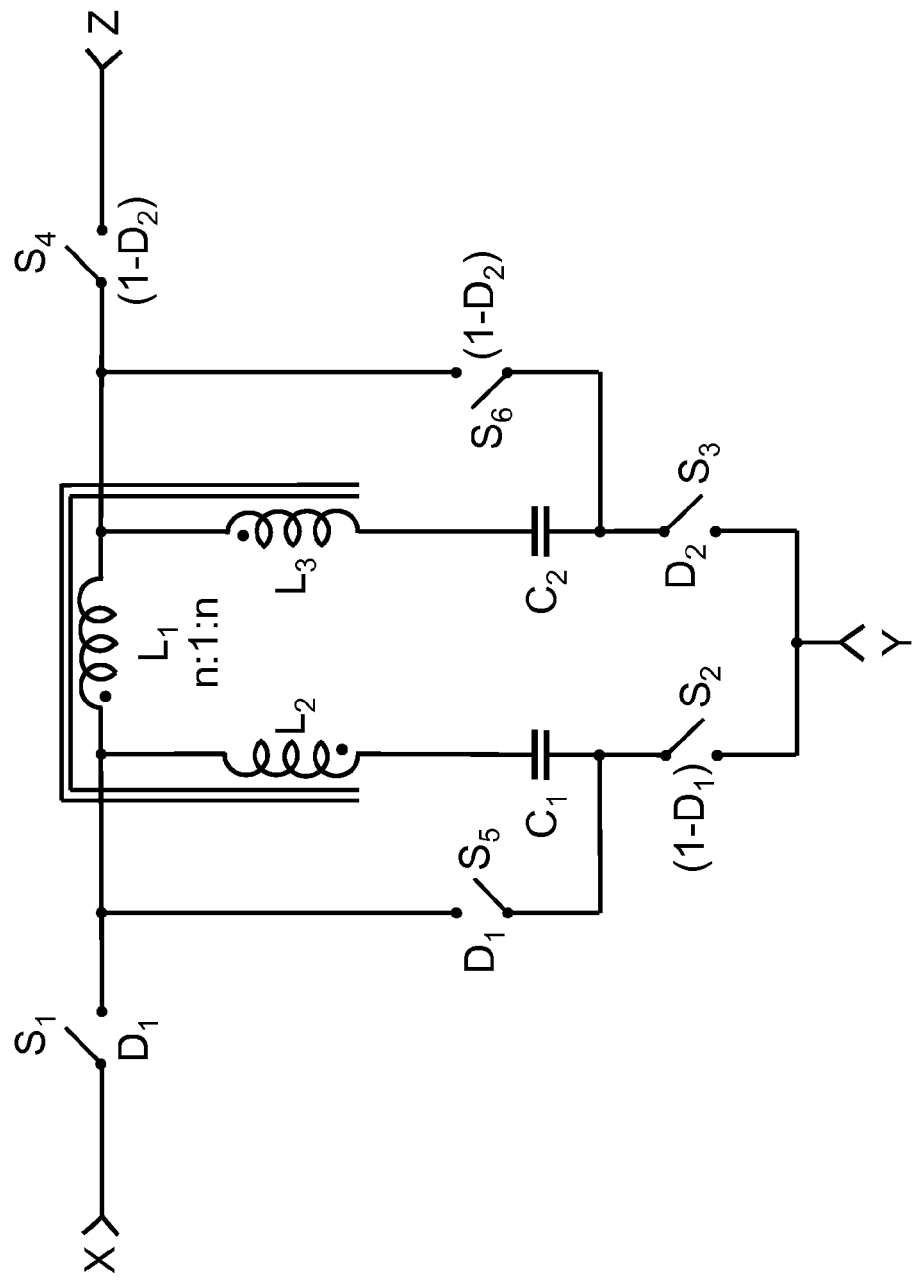
FIG. 26 illustrates a power conversion network formed from a cascade combination of the tapped inductor buck converter of FIG. 9 and the tapped inductor boost converter of FIG. 10 combined in the manner illustrated in FIG. 19 according to the subject invention.

FIG. 26, which is another embodiment of the subject invention, illustrates another variation of the FIG. 23 power conversion network. The FIG. 26 network adds a capacitor $C_1$ in series with winding $L_2$ and a capacitor $C_2$ in series with winding $L_3$. A switch $S_5$ is added parallel to the series network of $C_1$ and $L_2$ and a switch $S_6$ is added parallel to the series network of $C_2$ and $L_3$. The addition of the switches $S_5$ and $S_6$ and the capacitors $C_1$ and $C_2$ to the FIG. 23 power conversion network results in a reduction of voltage stress of all of the circuit's switches. The transfer functions for the FIG. 26 network differ from those of the FIG. 23 network. The operation of the switches is as indicated in FIG. 26 except that during the first operating state the duty cycle for $S_6$ is 0% and the duty cycle for switch $S_5$ is 0% during the third operating state. For the first operating mode the transfer function is $$V_X - V_Z = \frac{[V_Z - V_Y - n(V_X - V_Z)](1 - D_1)}{(1-n)D_1},$$

for the second operating mode the transfer function is $V_X = V_Z$, and for the third operating mode the transfer function is $$V_Z - V_X = \frac{[V_X - V_Y - n(V_Z - V_X)]D_2}{(1+n)(1 - D_2)}.$$

The FIG. 26 power conversion network can be used to form practical minimum voltage tapped inductor SEPICs for small step up and step down ratios and practical minimum voltage tapped inductor four quadrant converters for large step down ratios.

Figure 27:
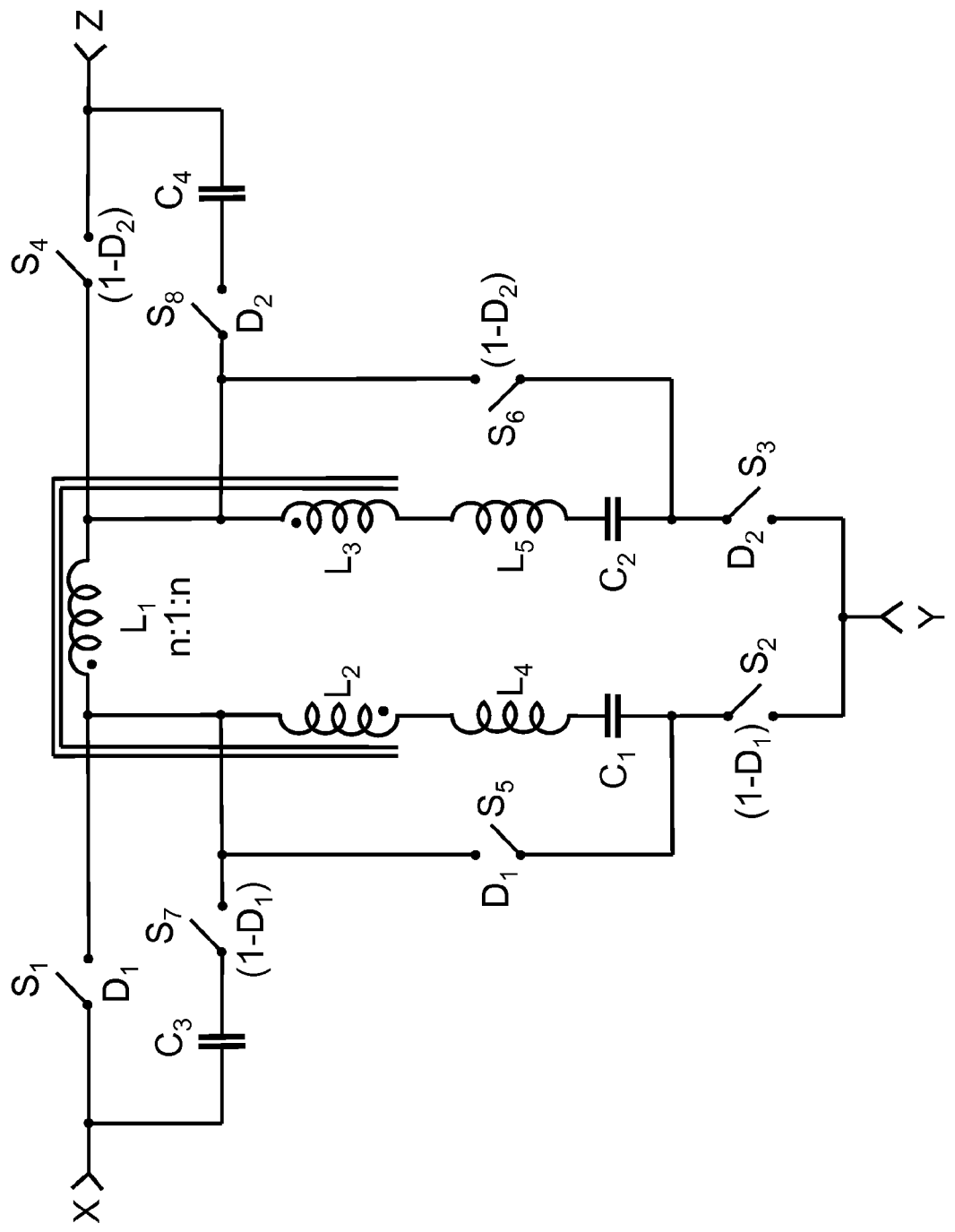
FIG. 27 illustrates the power conversion network of FIG. 26 with series inductances and active clamp networks added to form a zero voltage switching fully clamped power conversion network according to the subject invention.

FIG. 27, which is another embodiment of the subject invention, illustrates a power conversion network similar to the FIG. 26 power conversion network but with inductances $L_4$ and $L_5$ added in series with $L_2$ and $L_3$, respectively, and with the addition of two active clamp networks. The series inductances can be discrete inductors or leakage inductances of the coupled inductor. An active clamp network comprised of $S_7$ and $C_3$ is added in parallel to $S_1$ to clamp the $L_1$ winding during the off state of $S_1$ and an active clamp network comprised of $S_8$ and $C_4$ is added in parallel with $S_4$ to clamp $L_1$ during the off state of $S_4$. The operation of the switches is as indicated in FIG. 27 except that during the first operating state the duty cycle for $S_6$ is 0% and the duty cycle for switch $S_5$ is 0% during the third operating state. With the added series inductances a mechanism exists to provide stored magnetic energy that can be used to achieve zero voltage switching for all of the switches for every transition. The active clamp networks provide full clamping for all of the windings for every operating state so that there is no ringing possible associated with the coupled inductor and circuit parasitic capacitances.

Figure 28:
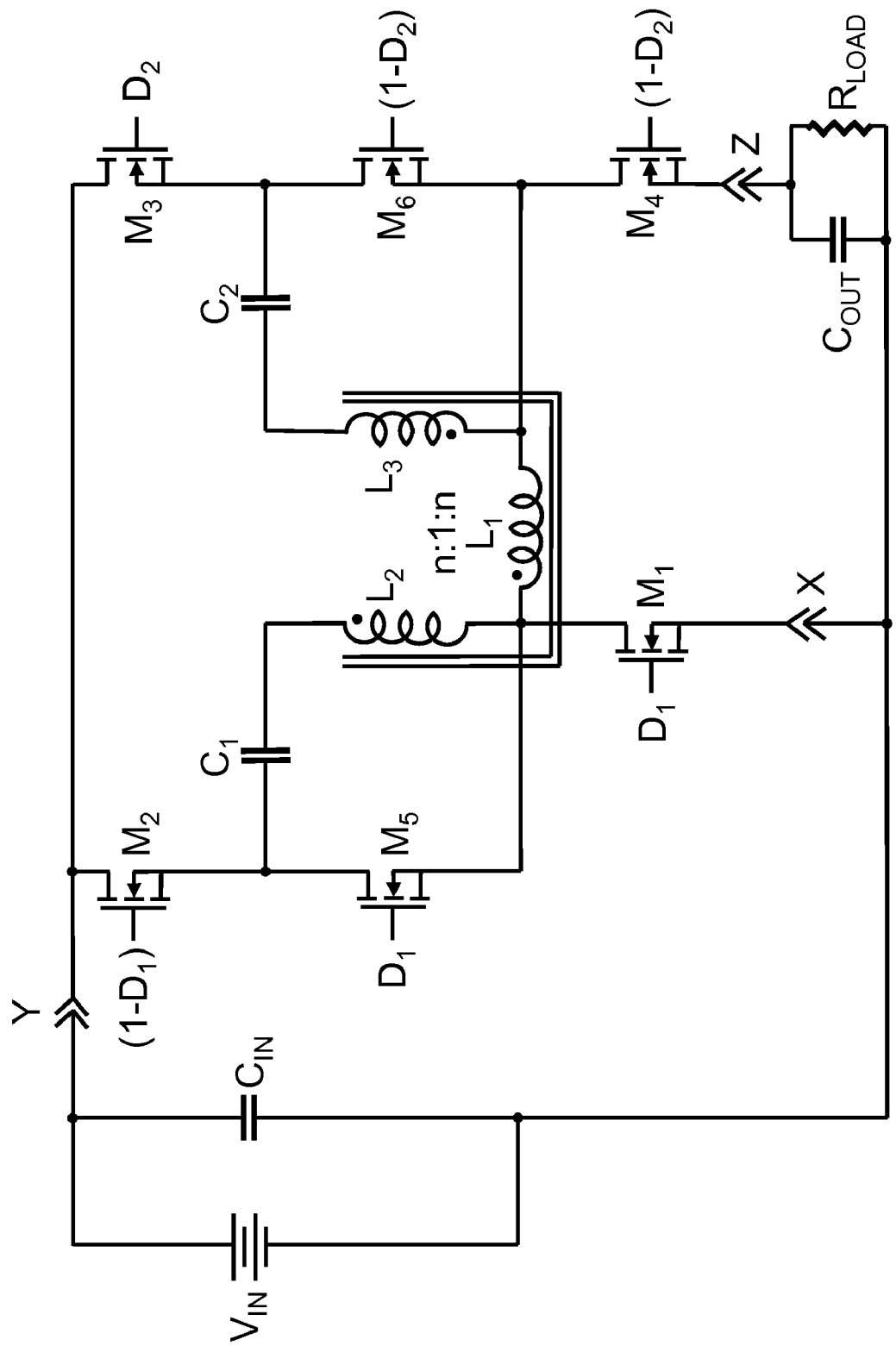
FIG. 28 illustrates the power conversion network of FIG. 26 configured to form a four quadrant converter for large step down ratios according to the subject invention.
Figure 29:
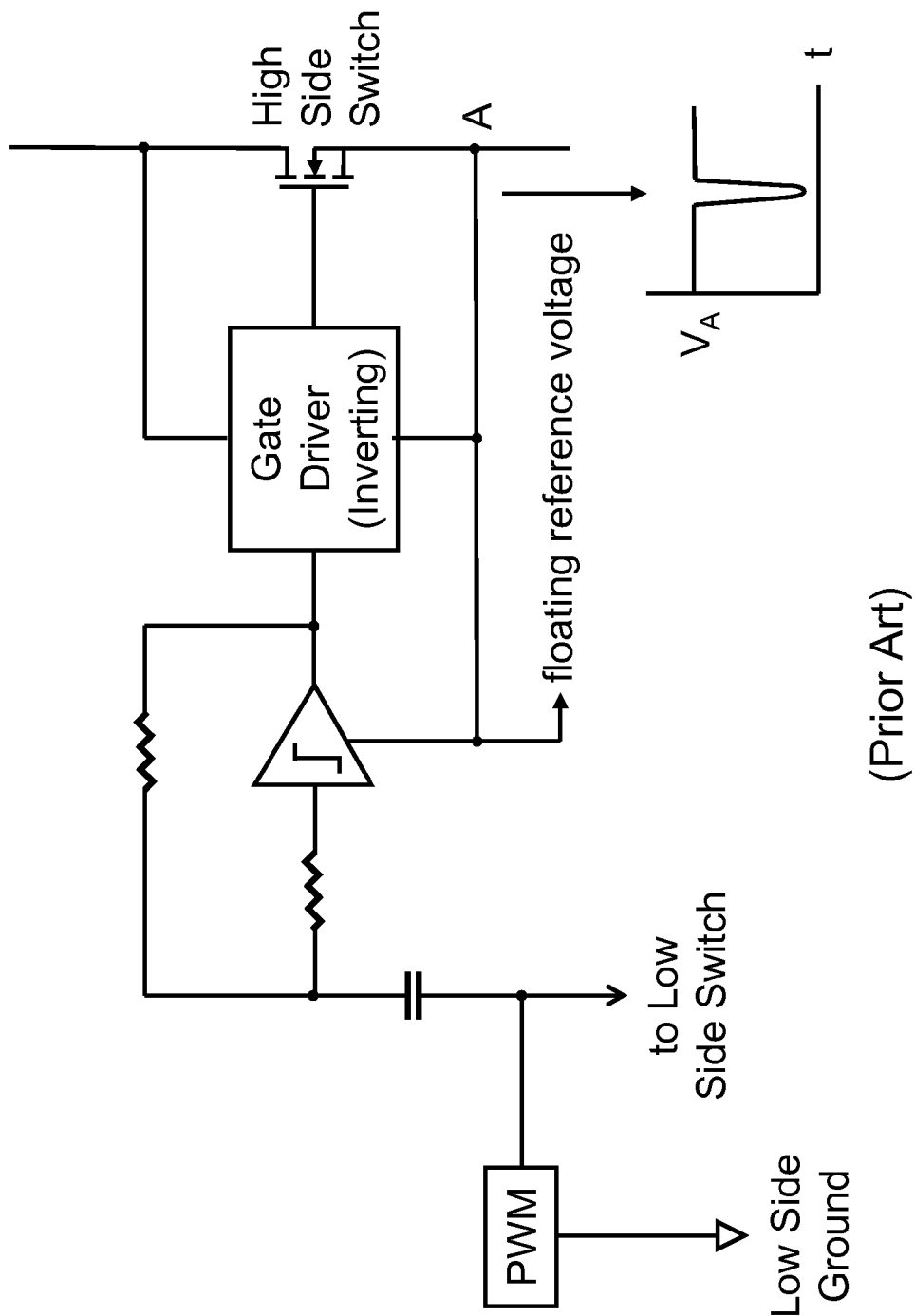
FIG. 29 illustrates a high side drive control circuit with positive current feedback for rejecting small variations of the floating reference voltage according to the prior art.
Figure 30:
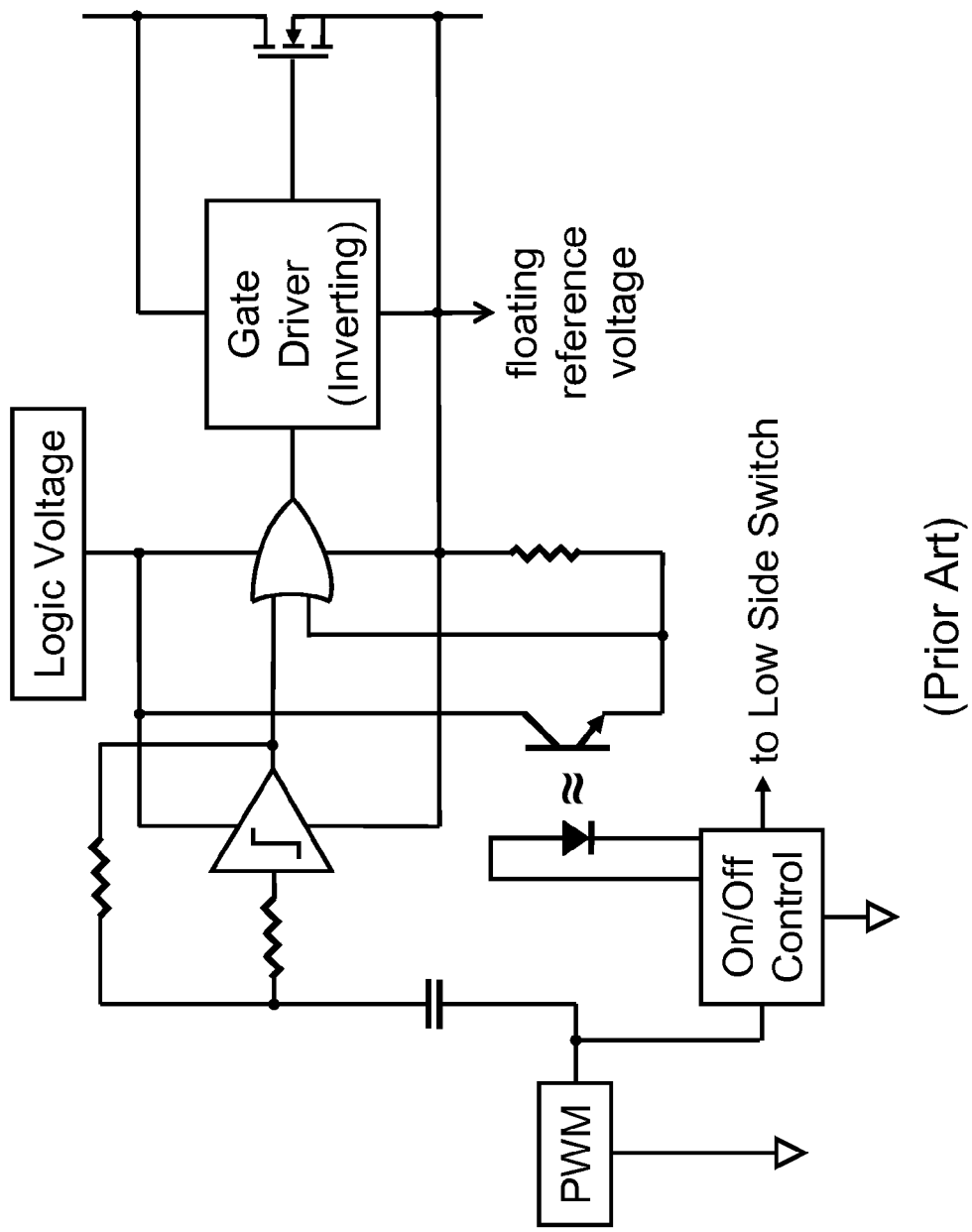
FIG. 30 illustrates the high side drive control circuit of FIG. 29 with an OR gate and opto-coupler for disabling the circuit on command according to the prior art.

FIG. 28, which is another embodiment of the subject invention, illustrates a minimum voltage tapped inductor four quadrant converter suitable for large step down ratios using the power converter network of FIG. 26 and implemented with mosfet switches. During the first operating mode switch $M_4$ is constantly on, switches $M_3$ and $M_6$ are constantly off, $D_1$ has a value between 0% and 100%, and the load voltage at terminal Z is positive with respect to the X terminal voltage which is the circuit's ground. As $D_1$ is decreased the voltage at the output rises in magnitude. During a second operating mode switches $M_1$ and $M_4$ are constantly on and all of the other switches are off and the output voltage is zero. During a third operating mode switch $M_3$ is constantly on, switches $M_2$ and $M_5$ are constantly off, and the output voltage is negative. As $D_2$ is increased the output voltage becomes increasingly negative.

Figure 31:
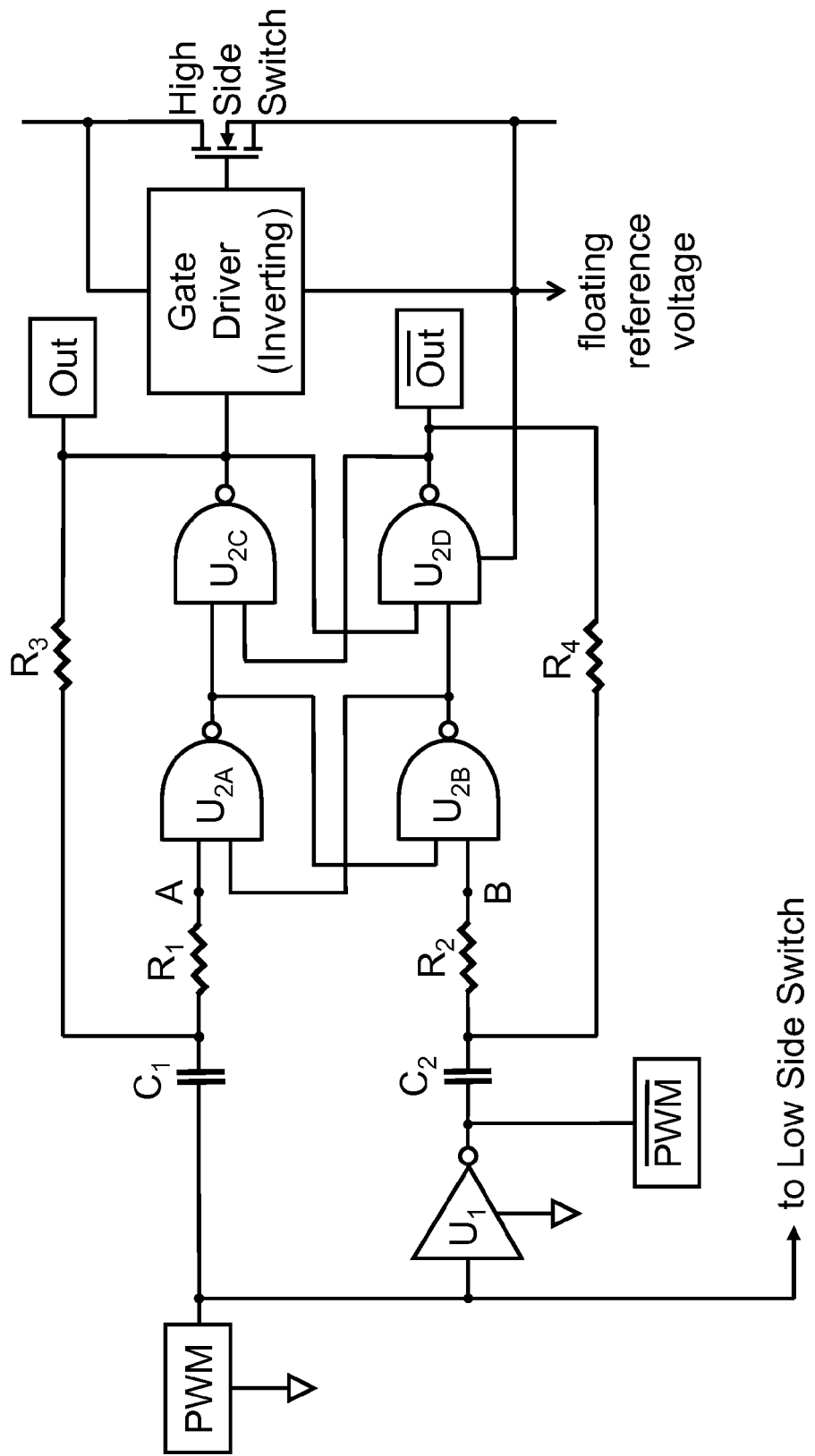
FIG. 31 illustrates a high side drive circuit containing a digital logic circuit based on NAND gates that rejects all variations of the floating reference voltage according to the subject invention.

FIG. 31, which is another embodiment of the subject invention, illustrates a floating gate drive control circuit for a high side switch or other switch with floating reference voltage compared to the originating timing signals. The originating timing signal is labeled PWM in FIG. 31 and it appears in both inverted and non-inverted forms as inputs to the floating gate drive control circuit. The desired result is the change of state of the output labeled OUT in both its non-inverted and inverted forms in response to a change in state of the originating PWM signal and the rejection of changes in state due to changes in the floating reference voltage. Suppose that initially the PWM signal is in a high logic state and OUT is also in a high voltage state so that the output of $U_{2C}$ is high and the output of $U_{2D}$ is low. The node A voltage will be high and the node B voltage will be low in the initial condition. Because the node B voltage is low the $U_{2B}$ output will be high and both inputs to $U_{2A}$ will be high so that the output of $U_{2A}$ will be low. With the $U_{2A}$ output low the output of $U_{2C}$ will be high and both inputs to $U_{2D}$ will be high so the output of $U_{2D}$ will be low. With the output of $U_{2D}$ low both inputs to $U_{2C}$ are low. When the floating reference voltage rises nodes A and B will both go to a low state and the outputs of $U_{2A}$ and $U_{2B}$ will both go to a high state. This change does not effect inputs to $U_{2D}$ since both inputs were initially high, but now one of the inputs to $U_{2C}$ is a high, but since the output of $U_{2D}$ is still low one of the inputs to $U_{2C}$ is low, so the output of $U_{2C}$ will remain high during the transition in which the floating reference voltage is rising. When the transition is complete and the floating reference voltage stops rising, the node A voltage will return to its initial high state driven by the output of $U_{2C}$ through $R_3$. During a fast negative going transition the capacitors $C_1$ and $C_2$ must discharge which forces the voltage at nodes A and B to a high state. With the output of $U_{2A}$ initially in a low state the $U_{2B}$ output will remain in its initial high state so that the $U_{2A}$ output will also remain unchanged during the negative going transition of the floating reference voltage. Since there is no change in the outputs of $U_{2A}$ and $U_{2B}$ there can be no change in the outputs of $U_{21C}$ and $U_{2D}$. When the negative going transition is complete and the floating reference voltage stops changing the output of $U_{2D}$ will force the node B voltage back to its initial low state through $R_4$. During a time interval in which the floating reference voltage is relatively steady a change in the PWM signal from high to low will create a low voltage at node A and a high voltage at node B. The low voltage at node A will force the output of $U_{2A}$ to a high state. With the node B voltage in a high state and the output of $U_{2A}$ high the output of $U_{2B}$ will go to a low state. The low state at the output of $U_{2B}$ will force the output of $U_{2D}$ high so that both of the inputs of $U_{2C}$ will be high and the output of $U_{2C}$ will go low. Positive current feedback to node A from $U_{2C}$ through $R_3$ helps node A to reject small or slow variations of the floating reference voltage that might otherwise cause the node A voltage to change state. Similarly positive current feedback to node B from $U_{2D}$ through $R_4$ helps node B to reject small of slow variations of the floating reference voltage that might otherwise cause the node B voltage to change state. The digital logic circuit comprising the four 2 input NAND gates and the positive current feedback resistors $R_3$ and $R_4$ form a floating gate drive control circuit that responds to fast changes in the originating signals and rejects changes in the floating reference voltage.

Figure 32:
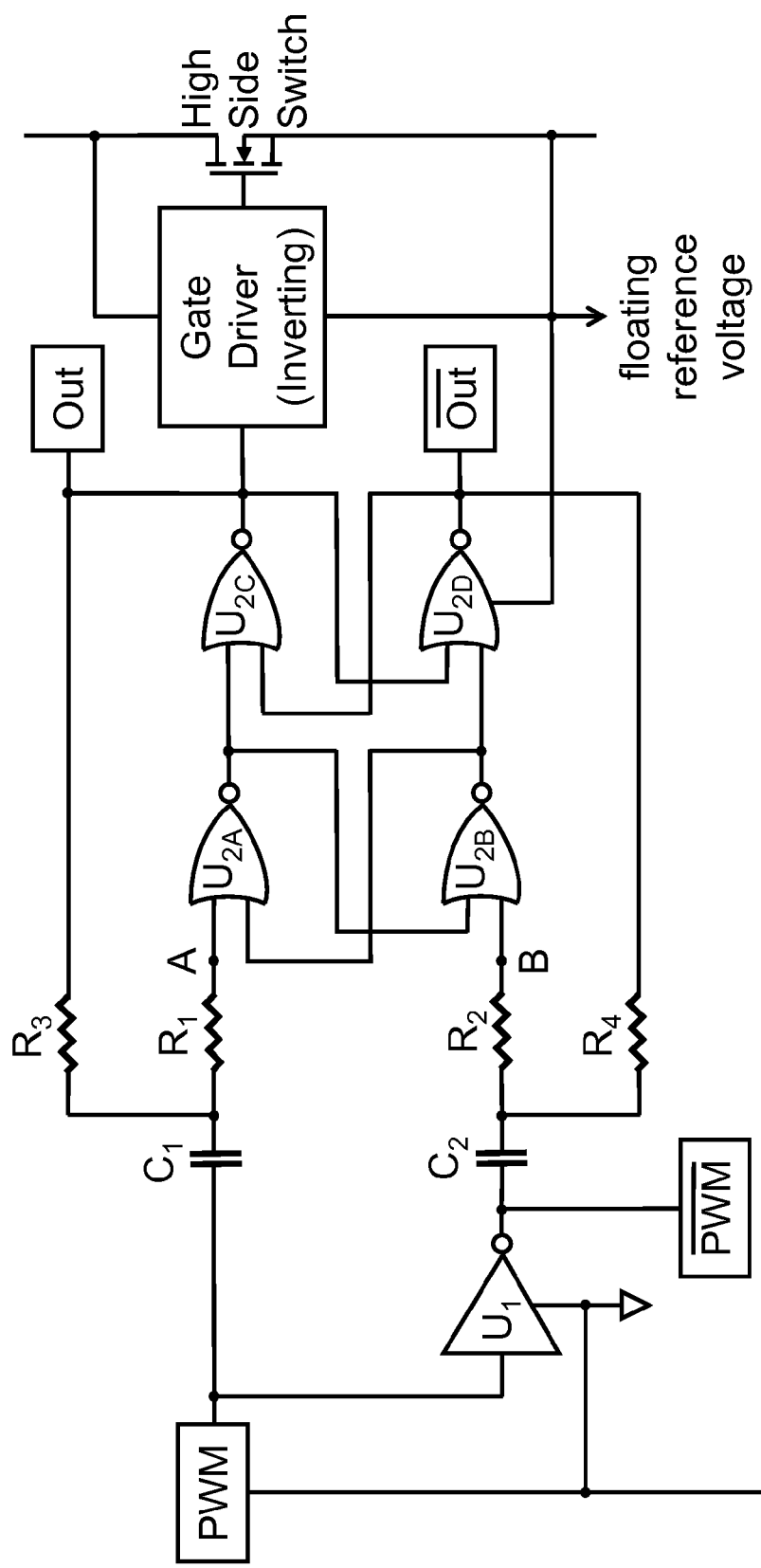
FIG. 32 illustrates a high side drive circuit containing a digital logic circuit based on NOR gates that rejects all variations of the floating reference voltage according to the subject invention.
Figure 33:
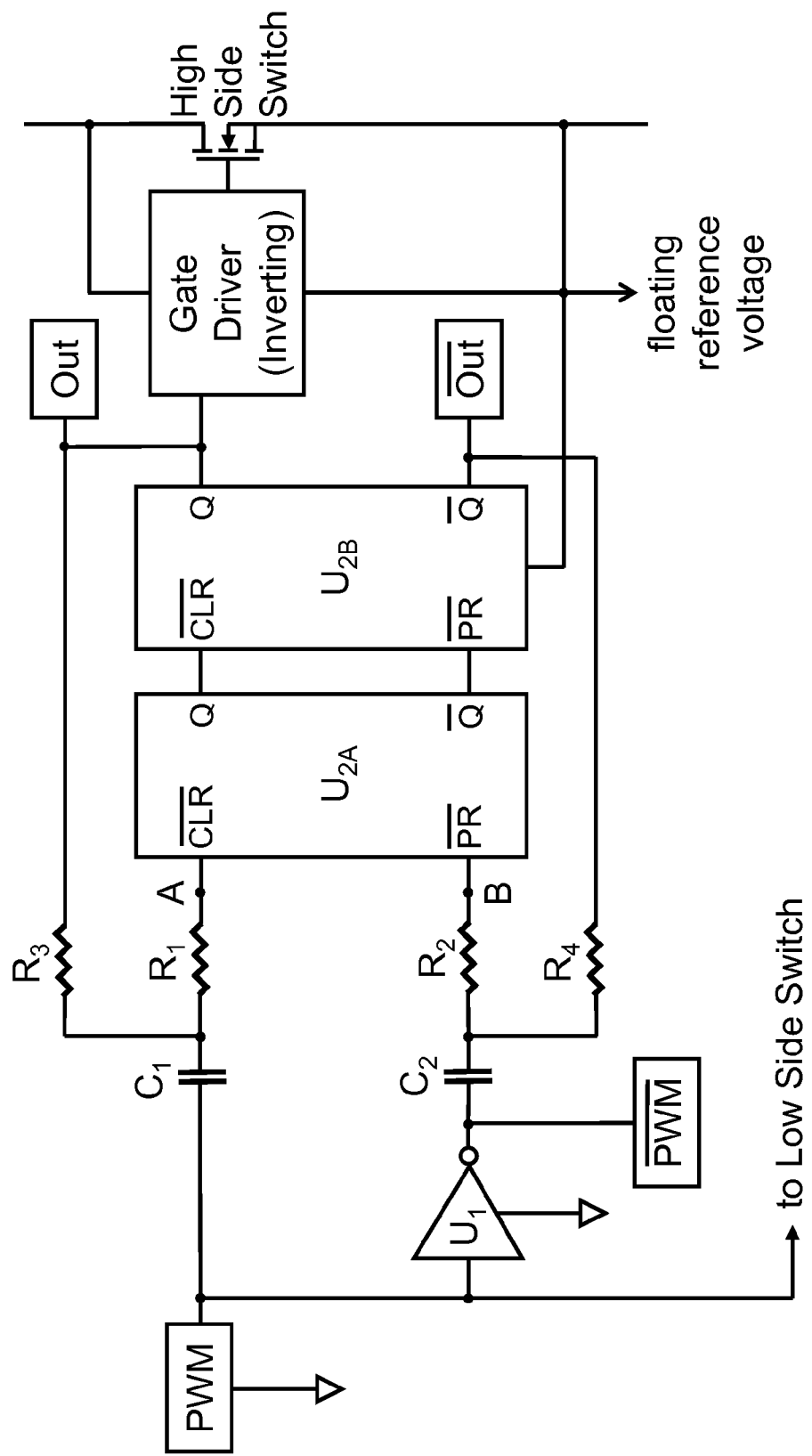
FIG. 33 illustrates a high side drive circuit containing a digital logic circuit based on flip flops that rejects all variations of the floating reference voltage according to the subject invention.
Figure 34:
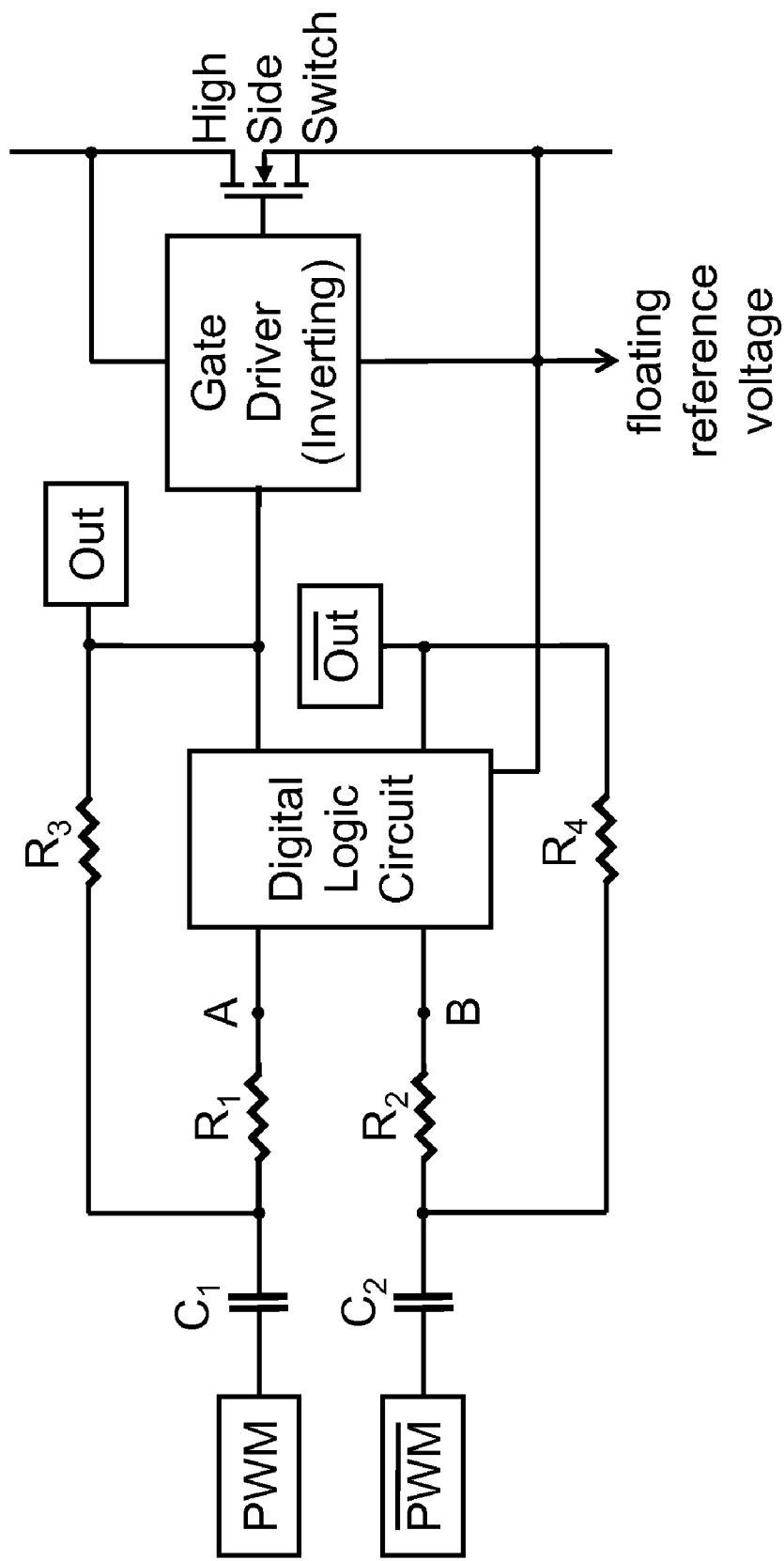
FIG. 34 illustrates a high side drive circuit containing a generalized digital logic circuit that rejects all variations of the floating reference voltage according to the subject invention.
Figure 35:
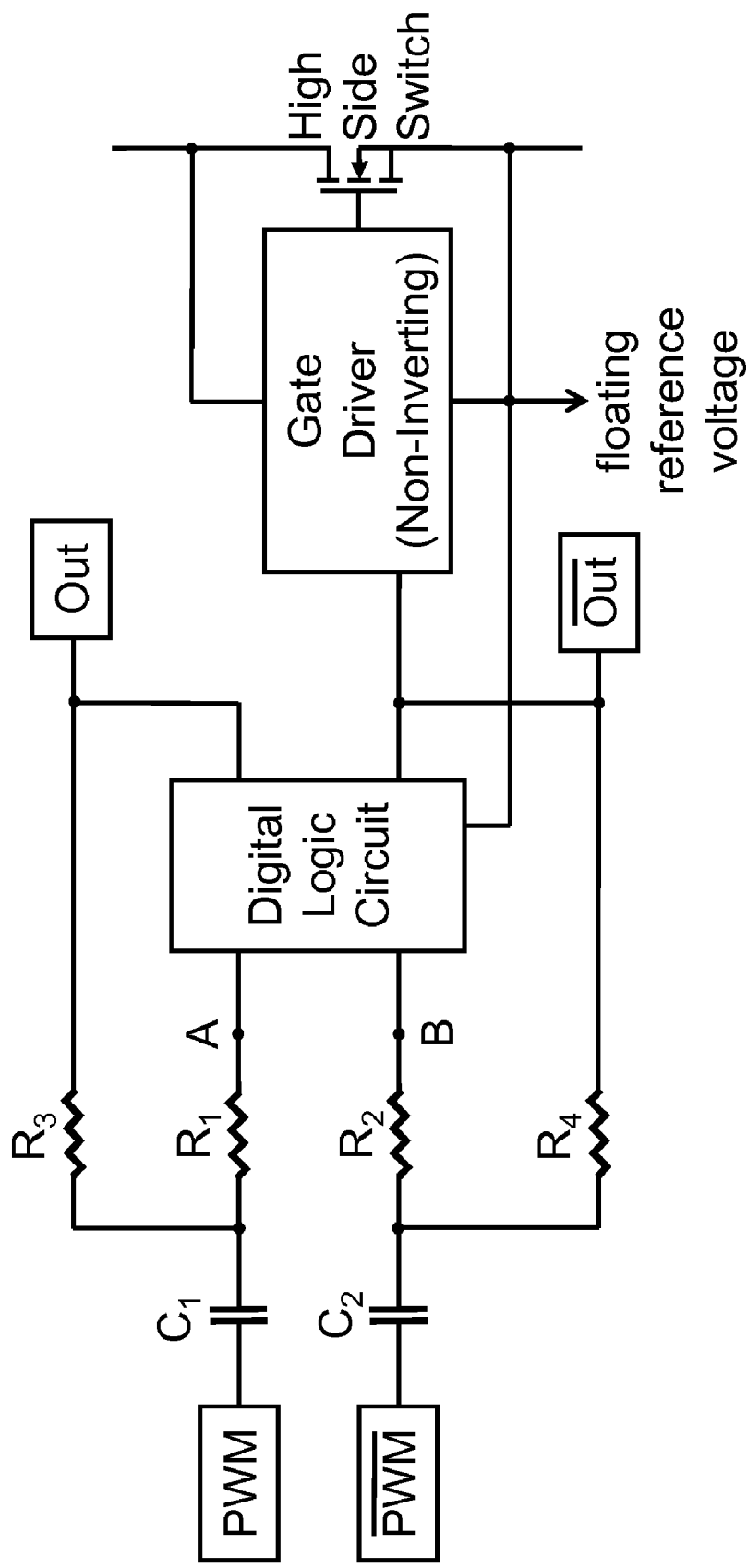
FIG. 35 illustrates a high side drive circuit containing a generalized digital logic circuit that rejects all variations of the floating reference voltage which is similar to the circuit of FIG. 34 but uses the inverted output of the generalized digital logic circuit and a non-inverting driver to achieve identical results to the FIG. 34 circuit according to the subject invention.

FIG. 32, which is another embodiment of the subject invention, shows an alternate method of realizing the same performance as achieved by the FIG. 31 circuit. The FIG. 32 circuit uses four 2 input NOR gates instead of the NAND gates of FIG. 31. Another alternate method of achieving the same results is illustrated in FIG. 33, which is another embodiment of the subject invention, wherein two cascaded flip flops are used in place of the NAND gates. In all of the FIGS. 31 through 33 when the node A and node B voltages are different then the outputs will change state, but if the node A and node B voltage have the same state then no change in the outputs is allowed. There are likely many digital logic circuits that can achieve the same results as the digital logic circuits illustrated in FIGS. 31 through 33. FIG. 34, which is another embodiment of the subject invention, illustrates the floating gate drive control circuit with a general digital logic circuit wherein the digital logic circuit may be any of the digital logic circuits illustrated in FIGS. 31 through 33 or any of a number of other digital logic circuits that generate the same outputs from the same inputs. FIG. 35, which is another embodiment of the subject invention, illustrates that the inverting output from the digital logic circuit can be used with a non-inverting gate driver as an alternative to the non-inverting output of the digital logic circuit combined with an inverting gate driver to accomplish gate drive control.

Figure 36:
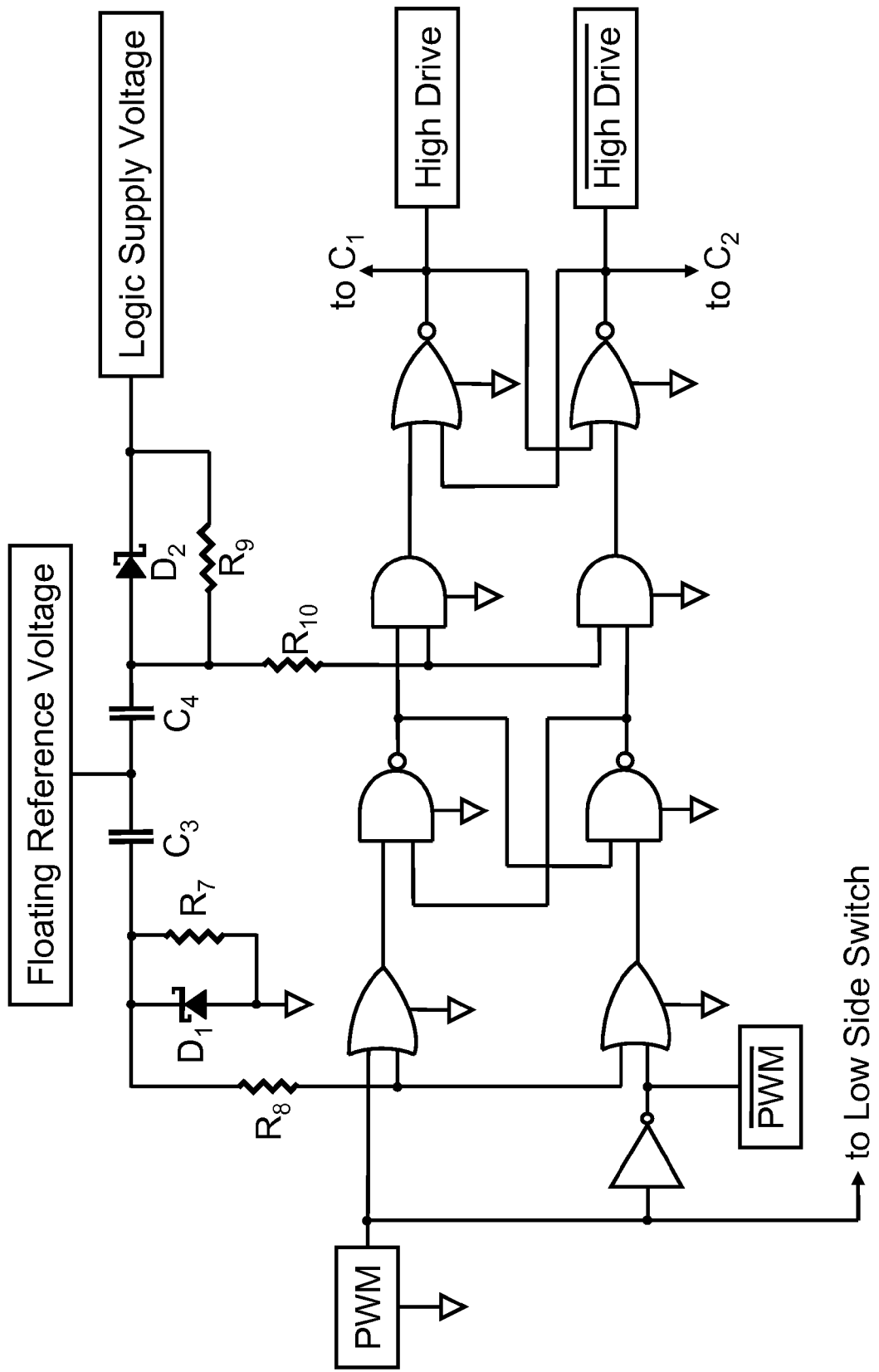
FIG. 36 illustrates a digital logic circuit that generates brief delays in the timing signals used to control the high side drive circuit of FIG. 34 during the brief transition times according to the subject invention.
Figure 39:
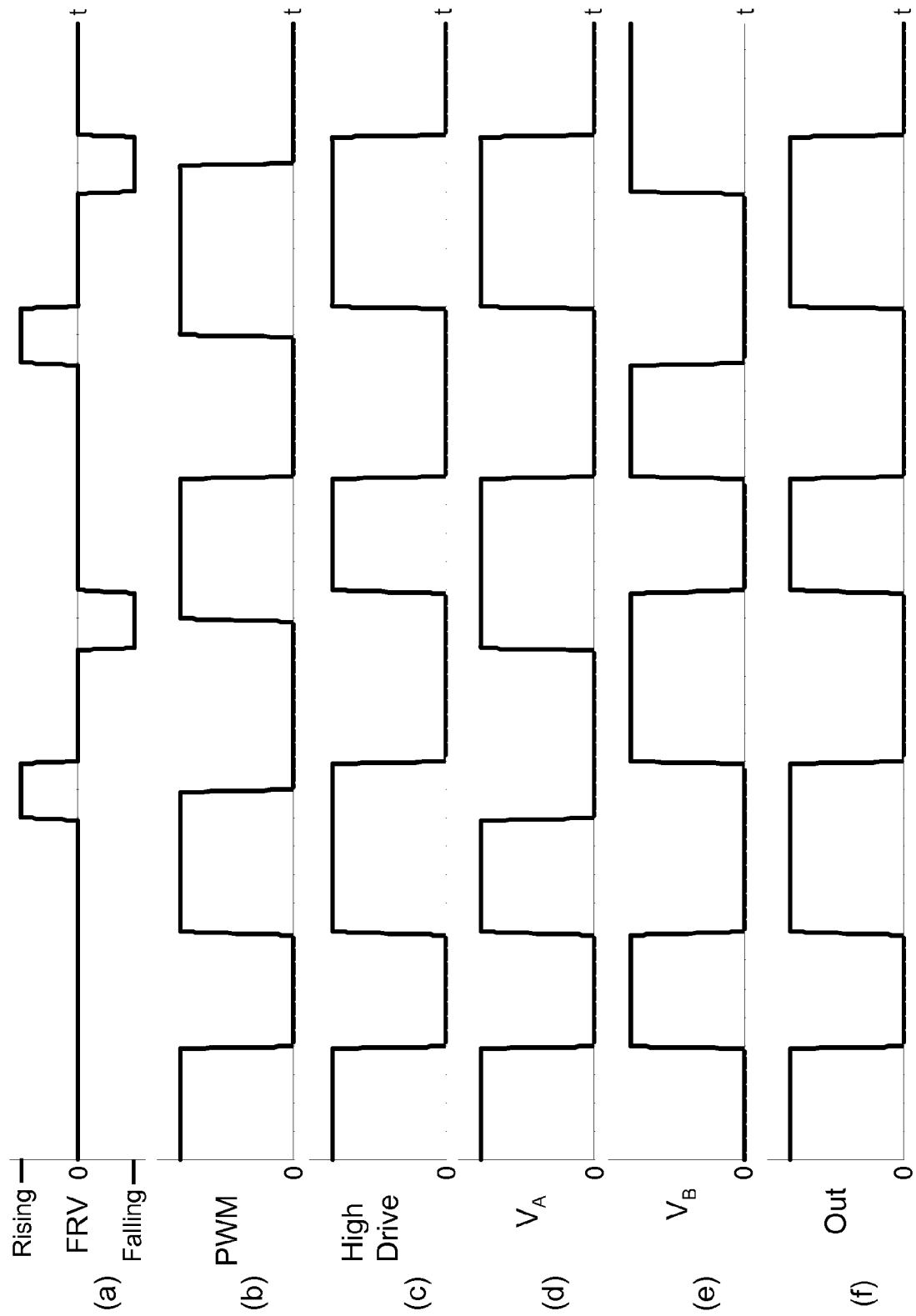
FIG. 39(a) illustrates a timing signal indicating the status of the floating reference voltage (FRV) of a high side switch according to the subject invention.
FIG. 39(b) illustrates a PWM timing input signal for a floating gate drive control circuit based on a combination of the circuits of FIG. 36 and FIG. 34 according to the subject invention.
FIG. 39(c) illustrates the output timing signal of the digital logic circuit of FIG. 36 which also forms the non-inverted input of the FIG. 34 circuit for a floating gate drive control circuit based on a combination of the circuits of FIG. 36 and FIG. 34 according to the subject invention.
FIG. 39(d) illustrates the node A voltage timing signal for a floating gate drive control circuit based on a combination of the circuits of FIG. 36 and FIG. 34 according to the subject invention.
FIG. 39(e) illustrates the node B voltage timing signal for a floating gate drive control circuit based on a combination of the circuits of FIG. 36 and FIG. 34 according to the subject invention.
FIG. 39(f) illustrates the non-inverted output voltage timing signal for a floating gate drive control circuit based on a combination of the circuits of FIG. 36 and FIG. 34 according to the subject invention.

In order to accomplish a change in state for the digital logic circuit of the floating gate drive control circuits of FIGS. 31 through 35 complementary simultaneous fast transitions must be applied to the node A and node B inputs to the digital logic circuits. If the originating signal were to change state during a time interval in which the floating reference voltage is rising or falling rapidly then the desired change in state of the digital logic circuit may not occur because a rapidly rising floating reference voltage will force the node A and node B voltages into a low state regardless of the change in the originating signal and a rapidly falling floating reference voltage will force the node A and node B voltages into a high state regardless of the change in the originating signal. FIG. 36, which is another embodiment of the subject invention, illustrates a circuit that delays a change in state of the originating signals to the floating gate drive control circuit for the duration of a time interval in which the floating reference voltage is rapidly changing. With a floating reference voltage that is neither rising nor falling the OR gates in FIG. 36 will pass through the logic state of the originating signals which will be inverted in the NAND gates, but when the floating reference voltage (FRV) is rising the output of the OR gates will both be high which will disallow any change in state of the NAND gates. $R_7$ holds the FRV inputs to the OR gates low when the floating reference voltage is steady and $D_1$ clamps the FRV inputs to the OR gates to ground when the FRV is falling. $R_8$ limits current into the OR gates so that the OR gates will not be damaged by the $C_3$ current. When the floating reference voltage is steady the AND gates will pass on the inputs from the outputs of the NAND gates to the NOR gates which perform a second inversion, but if the floating reference voltage is falling then one of the ANDs inputs will be low and the outputs of both AND gates will be low which will disallow any change in state at the outputs of the NOR gates. $R_9$ holds the FRV inputs to the AND gates high when the FRV is steady and $R_{10}$ prevents damage to the FRV inputs to the AND gates from $C_4$ currents. In summary no change in state is allowed while the floating reference voltage is rising and no change in state is allowed while the floating reference voltage is falling so that any change in state at the outputs of the NOR gates will be delayed while the floating reference voltage is rising or falling. Changes in state commanded by the originating signal are accomplished but are delayed until a time at which the change will effect the output and achieve the desired result. Any change in state of the originating signal will be passed on while the floating reference voltage is steady and unable to effect the voltages at the nodes A and B at the inputs to the digital logic circuit of the floating gate drive control circuit. With the combination of the FIG. 36 circuit and the FIG. 34 or FIG. 35 circuit a floating gate drive control circuit with complete immunity to changes in floating reference voltage is achieved. FIGS. 39(a) through 39(f) illustrate voltages at circuit nodes within the circuits illustrated in FIGS. 35 and 36. In FIG. 39(a) FRV refers to the floating reference voltage. The transition times indicated in FIG. 39(a) are much longer than typical transition times in actual practice for purposes of illustrating the operation of the circuit.

Figure 37:
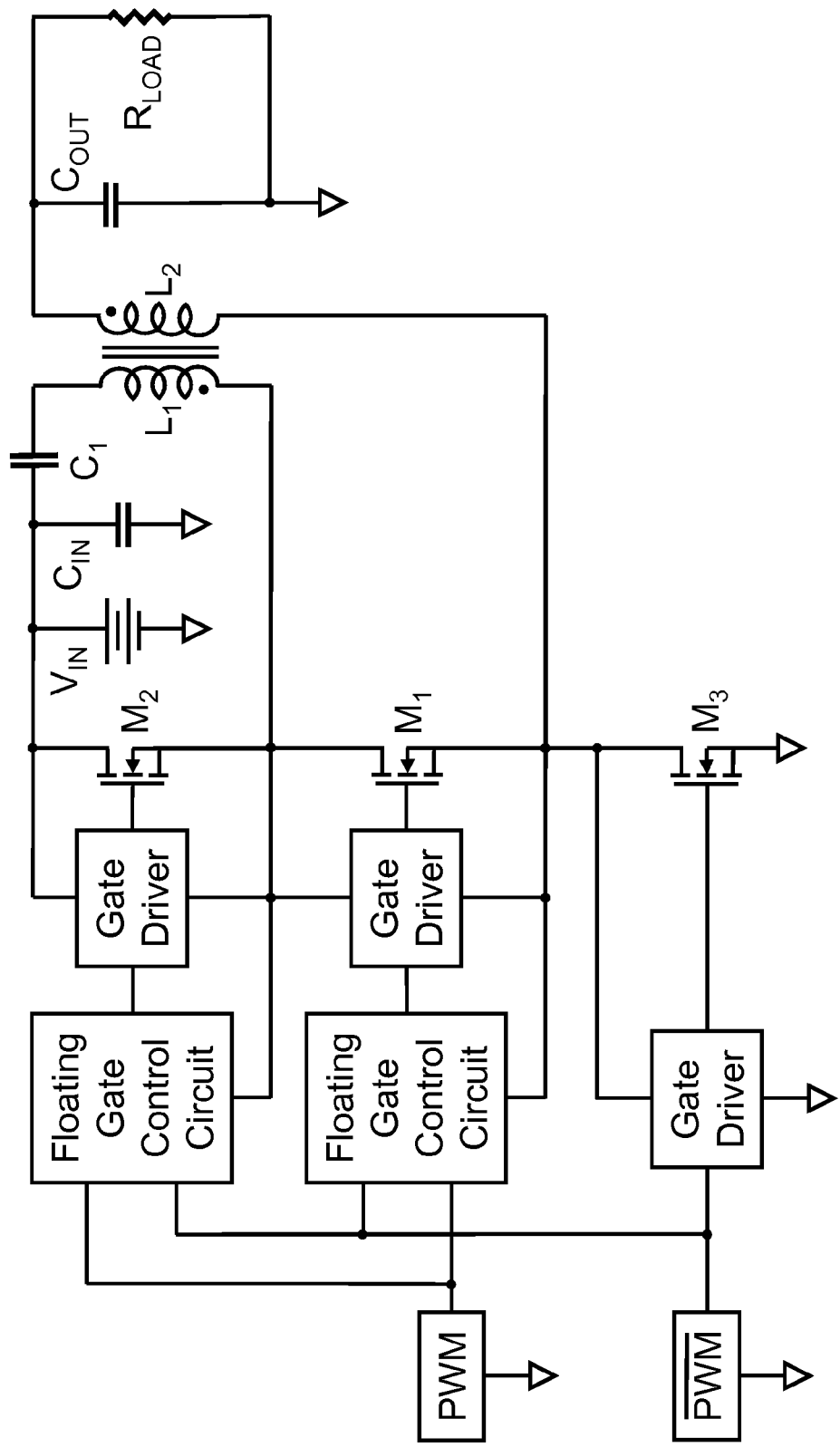
FIG. 37 illustrates floating gate drive control circuits of FIG. 34 used to control the two high side switches of FIG. 3 according to the subject invention.

FIG. 37, which is another embodiment of the subject invention, illustrates a minimum voltage tapped inductor buck converter for large step down ratios with the switches implemented with mosfets, similar to the FIG. 3 circuit, illustrating the application of the floating gate drive control circuit to the high side switches with floating reference voltages in the FIG. 3 circuit.

Figure 38:
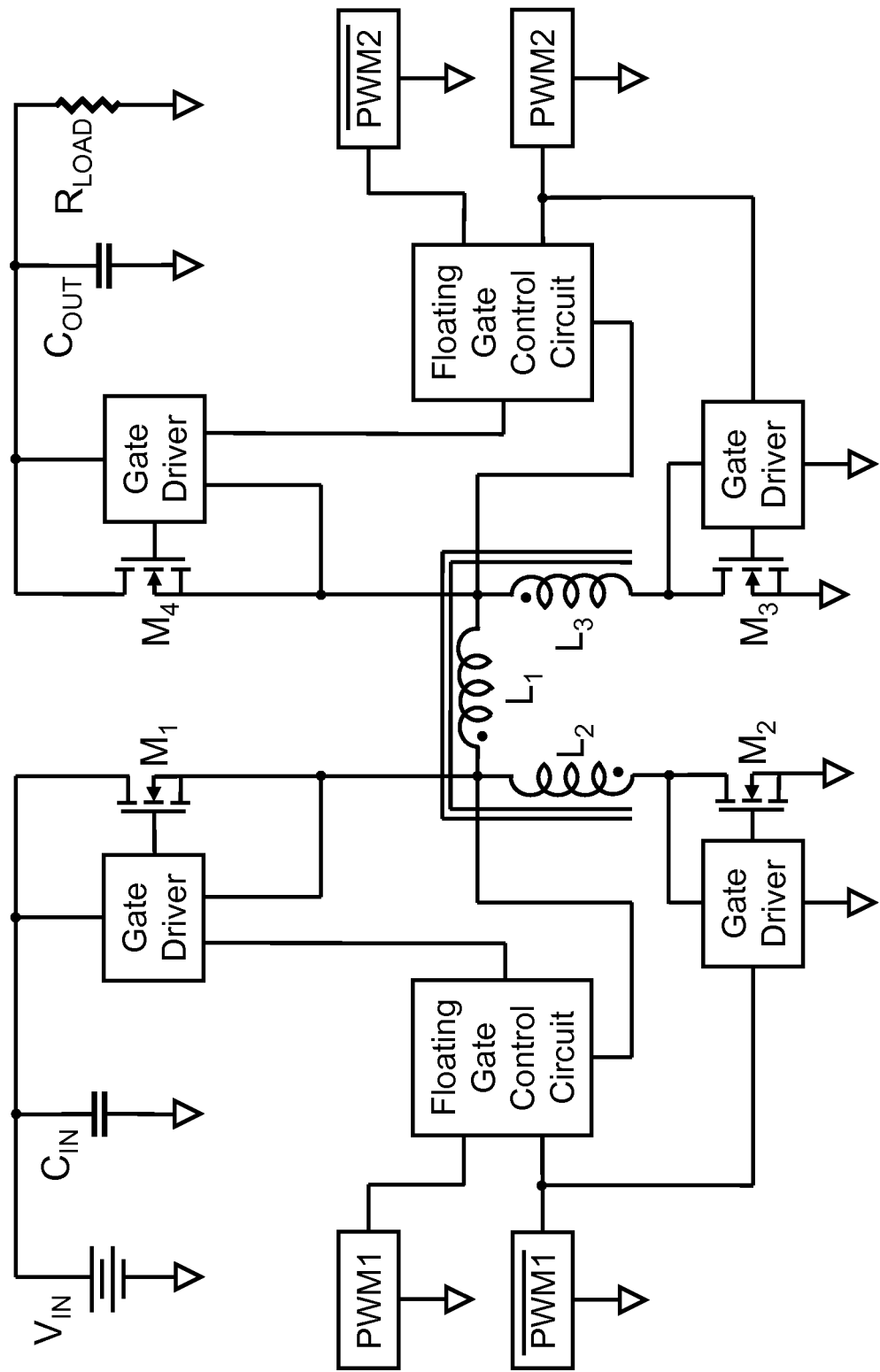
FIG. 38 illustrates floating gate drive control circuits of FIG. 34 used to control the two high side switches of FIG. 20 according to the subject invention.

FIG. 38, which is another embodiment of the subject invention, illustrates a tapped inductor SEPIC for small step down and step up ratios implemented with mosfets as switches wherein the high side switches are controlled by the floating gate drive control circuits of the subject invention.

CONCLUSION, RAMIFICATIONS, AND SCOPE OF INVENTION

Thus the reader will see that by the addition of a capacitor and a switch to a prior art tapped inductor power conversion network a new tapped inductor power conversion network is formed with reduced component voltage stress and high efficiency. Variations of the new power conversion network which achieve zero voltage switching for all of the switches for every switching transition are revealed including forms which eliminate all ringing associated with series inductance used to provide stored magnetic energy used to drive zero voltage turn on transitions. Other new tapped inductor power conversion networks are revealed which provide reduced component stresses in SEPIC and four quadrant converters, including several new forms that achieve zero voltage switching and lower switch voltage stress than all of the prior art. Also, a capacitor coupled floating gate drive control circuit is revealed which can achieve reliable operation while the reference voltage of a high side switch changes rapidly. New circuit forms which combine the floating gate drive control circuit with tapped inductor power conversion networks to form new beneficial power converters with a minimum of magnetic components are revealed.

While my above description contains many specificities, these should not be construed as limitations on the scope of the invention, but rather, as exemplifications or preferred embodiments thereof. Many other variations are possible. For example, in some of the circuits illustrated one can find alternate workable connections of the active clamp networks that accomplish full clamping of the same winding in the same operating state as the active clamp network illustrated in the figures of this application, but these too should be considered embodiments of the subject invention. There are specific digital logic circuits revealed in the subject invention to achieve the results claimed but many other digital logic circuits that can achieve the same outputs with the same inputs should also be considered embodiments of this invention. Circuits similar to the circuits shown but with polarity of the input or output reversed from that illustrated in the figures shall be considered embodiments of the subject invention. Circuits similar to those shown, but having coupled magnetic circuit elements with more than two windings and circuits with more than one output shall be considered embodiments of the subject invention. In many of the circuits shown there are series connected networks. The order of placement of circuit elements in series connected networks is inconsequential in the illustrations shown so that series networks in the illustrated circuits with circuit elements reversed or placed in an entirely different order within series connected networks are equivalent to the circuits illustrated and shall be considered embodiments of the subject invention. Also, most of the embodiments illustrated show simple switches, but the operation revealed and the benefits achieved in the subject invention can also be realized in circuits that implement the switches using N channel mosfets, P channel mosfets, IGBTs, JFETs, bipolar transistors, junction rectifiers, or schottky rectifiers, which should be considered embodiments of the subject invention.

Accordingly, the scope of the invention should be determined not by the embodiments illustrated, but by the appended claims and their legal equivalents.

I claim:

1. A power conversion network having two operating states, and having a first terminal, a second terminal, and a third terminal, comprising,
    a first circuit branch having a first terminal and a second terminal with said first terminal of said first circuit branch connected to said first terminal of said power conversion network, comprising,
    first switch means,
    a second circuit branch connected in series with said first switch means comprising,
        second switch means operated substantially in anti-synchronization to said first switch means,
        a series network connected in parallel to said second switch means, wherein a voltage applied to said series network is equal to a voltage applied to said second switch means, comprising,
            a first capacitor,
            a first winding of a coupled inductor, wherein a current in said first capacitor is equal to a current in said first winding of said coupled inductor,
    third switch means having a first terminal and a second terminal with said first terminal of said third switch means connected to said second terminal of said power conversion network and with said second terminal of said third switch means connected to said second terminal of said first circuit branch, operated substantially in anti-synchronization to said first switch means,
    a second winding of said coupled inductor having a first terminal and a second terminal with said first terminal of said second winding of said coupled inductor connected to said third terminal of said power conversion network and said second terminal of said second winding of said coupled inductor connected to said second terminal of said first circuit branch,
whereby said terminals of said power conversion network are connected to an input source of dc voltage and power, an output load, and a return common to both said input source of dc voltage and power and said output load to form a complete power conversion circuit.

2. The power conversion network of claim 1 wherein said switch means comprise semiconductor switch means.

3. The power conversion network of claim 1 further comprising a series inductance connected in series with said coupled inductor,
    whereby said series inductance provides stored energy used to drive a zero voltage turn on transition of said first switch means.

4. An improvement to said power conversion network of claim 1 comprising,
    addition of an active clamp network coupled to said second winding of said coupled inductor comprising a series connection of,
        fourth switch means operating substantially in synchronization with said first switch means,
        a second capacitor,
whereby, with the addition of said active clamp network, said coupled inductor is fully clamped wherein both windings of said coupled inductor are clamped during both operating states of said power conversion network, and whereby said active clamp network provides a mechanism for a reversal of current needed to accomplish zero voltage switching.

5. The power conversion network of claim 3 wherein said series inductance is a discrete series inductor separate from said coupled inductor.

6. The power conversion network of claim 3 wherein said series inductance is intrinsic to and a part of said coupled inductor.

7. A power conversion network having two operating states and having a first terminal, a second terminal, and a third terminal, comprising,
    first switch means having a first terminal and a second terminal with said first terminal of said first switch means connected to said first terminal of said power conversion network,
    second switch means having a first terminal and a second terminal with said first terminal of said second switch means connected to said second terminal of said power conversion network, operable substantially in anti-synchronization to said first switch means,
    a first winding of a coupled inductor having a dotted terminal and an undotted terminal with said dotted terminal of said first winding of said coupled inductor connected to said second terminal of said first switch means,
    a second winding of said coupled inductor having a dotted terminal and an undotted terminal with said undotted terminal of said second winding of said coupled inductor connected to said second terminal of said first switch means and with said dotted terminal of said second winding of said coupled inductor connected to said second terminal of said second switch means,
    third switch means having a first terminal and a second terminal with said first terminal of said third switch means connected to said third terminal of said power conversion network and said second terminal of said third switch means connected to said undotted terminal of said first winding of said coupled inductor,
    a third winding of said coupled inductor having a dotted terminal and an undotted terminal with said dotted terminal of said third winding of said coupled inductor connected to said second terminal of said third switch means,
    fourth switch means having a first terminal and a second terminal with said first terminal of said fourth switch means connected to said second terminal of said power conversion network and with said second terminal of said fourth switch means connected to said undotted terminal of said third winding of said coupled inductor, operable substantially in anti-synchronization to said third switch means, whereby said terminals of said power conversion network are connected to an input source of dc voltage and power, an output load, and a return common to both said input source of dc voltage and power and said output load to form a complete power conversion circuit.

8. The power conversion network of claim 7 wherein said switch means comprise semiconductor switch means.

9. The power conversion network of claim 7 further comprising an inductance connected in series with said coupled inductor,
whereby said series inductance provides energy to drive a zero voltage turn on transition for at least one of said switch means.

10. The power conversion network of claim 9 wherein said inductance is a discrete and separate inductor.

11. The power conversion network of claim 9 wherein said inductance is leakage inductance of said coupled inductor.

12. An improvement to said power conversion network of claim 7 comprising,
addition of active clamp networks such that for each operating state of said power conversion network, wherein at least one of said windings of said coupled inductor is not clamped, one of said active clamp networks is coupled to each of said windings of said coupled inductor, which is not clamped during said operating state of said power conversion network, each of said active clamp networks comprising a series connected combination of,
switch means, wherein said switch means are placed in a conducting state during said operating state in which said winding of said coupled inductor was not clamped and placed in a non-conducting state during all other operating states, and
a capacitor coupled to said winding of said coupled inductor during said operating state through said switch means,
for eliminating ringing and overshoot at all of said windings of said coupled inductor during all of said operating states of said power supply and for providing a mechanism for reversal of current to accomplish zero voltage switching.

13. The power conversion network of claim 7 further comprising,
a first capacitor connected in series between said second terminal of said second switch means and said dotted terminal of said second winding of said coupled inductor,
fifth switch means having a first terminal and a second terminal with said first terminal of said fifth switch means connected to said second terminal of said first switch means and with said second terminal of said fifth switch means connected to said second terminal of said second switch means, operable substantially in synchronization with said first switch means,
a second capacitor connected in series between said second terminal of said fourth switch means and said undotted terminal of said third winding of said coupled inductor,
sixth switch means having a first terminal and a second terminal with said first terminal of said sixth switch means connected to said second terminal of said third switch means and with said second terminal of said sixth switch means connected to said second terminal of said fourth switch means,
whereby said power conversion network provides similar performance with reduced switch voltage stress.

14. The power conversion network of claim 13 wherein said switch means comprise semiconductor switch means.

15. The power conversion network of claim 13 further comprising an inductance connected in series with said coupled inductor,
whereby said series inductance provides energy to drive a zero voltage turn on transition for at least one of said switch means.

16. The power conversion network of claim 15 wherein said inductance is a discrete and separate inductor.

17. The power conversion network of claim 15 wherein said inductance is leakage inductance of said coupled inductor.

18. An improvement to said power conversion network of claim 13 comprising,
addition of active clamp networks such that for each operating state of said power conversion network, wherein at least one of said windings of said coupled inductor is not clamped, one of said active clamp networks is coupled to each of said windings of said coupled inductor, which is not clamped during said operating state of said power conversion network, each of said active clamp networks comprising a series connected combination of,
switch means, wherein said switch means are placed in a conducting state during said operating state in which said winding of said coupled inductor was not clamped and placed in a non-conducting state during all other operating states, and
a capacitor coupled to said winding of said coupled inductor during said operating state through said switch means,
for eliminating ringing and overshoot at all of said windings of said coupled inductor during all of said operating states of said power supply and for providing a mechanism for reversal of current to accomplish zero voltage switching.

* * * * *